United States Patent
Sen et al.

(10) Patent No.: US 6,396,248 B1
(45) Date of Patent: *May 28, 2002

(54) VERSATILE POWER FLOW TRANSFORMERS FOR COMPENSATING POWER FLOW IN A TRANSMISSION LINE

(75) Inventors: Kalyan K. Sen; Mey Ling Sen, both of Vasteras (SE)

(73) Assignee: ABB T&D Technology Ltd., Zurich (CH)

(*) Notice: Subject to any disclaimer, the term of this patent is extended or adjusted under 35 U.S.C. 154(b) by 0 days.

This patent is subject to a terminal disclaimer.

(21) Appl. No.: 09/728,982

(22) Filed: Dec. 4, 2000

(51) Int. Cl.⁷ .................................................. G05F 1/70
(52) U.S. Cl. ..................... 323/209; 323/215; 323/216; 323/301; 323/341; 323/343
(58) Field of Search .................. 323/205, 208, 323/209, 210, 211, 215, 216, 255, 256, 258, 301, 305, 340, 341, 343, 361

(56) References Cited

U.S. PATENT DOCUMENTS

| | | | | |
|---|---|---|---|---|
| 1,873,777 A | * | 8/1932 | Mercereau et al. | 323/344 |
| 2,812,488 A | * | 11/1957 | Wright | 323/344 |
| 3,323,039 A | | 5/1967 | Kusko | 323/45 |
| 3,454,866 A | | 7/1969 | Beck et al. | 323/43.5 |
| 3,621,374 A | | 11/1971 | Kettler | 323/43.5 |
| 3,690,739 A | | 9/1972 | Prescott | 323/43.5 |
| 3,732,486 A | | 5/1973 | Schoendube | 323/43.5 |
| 3,818,321 A | | 6/1974 | Willner et al. | 323/43.5 |
| 3,978,395 A | | 8/1976 | Legnaioli | 323/43.5 |
| 4,156,174 A | | 5/1979 | Specht | 323/43.5 |
| 4,220,911 A | | 9/1980 | Rosa | 323/43.5 |
| 4,429,269 A | | 1/1984 | Brown | 323/301 |
| 4,549,254 A | | 10/1985 | Kissel | 363/21 |
| 4,622,513 A | | 11/1986 | Stich | 323/343 |
| 4,853,608 A | | 8/1989 | Schrade | 323/258 |
| 4,896,092 A | | 1/1990 | Flynn | 323/258 |
| 5,166,597 A | | 11/1992 | Larsen et al. | 323/215 |
| 5,355,295 A | | 10/1994 | Brennen | 363/40 |

(List continued on next page.)

OTHER PUBLICATIONS

Sen, STATCOM–STATic synchronous COMpensator: Theory, Modeling and Applications, IEEE Power Engineering Society Conference, 1999 Winter Meeting, Jan. 31–Feb. 4, 1999, pp. 1177–1183.

Sen, SSSC Static Synchronous Series Compensator: Theory Modeling and Applications, IEEE Transactions on Power Delivery, vol. 13, No. 1, Jan. 1998.

(List continued on next page.)

Primary Examiner—Jeffrey Sterrett
(74) Attorney, Agent, or Firm—Woodcock Washburn, LLP

(57) ABSTRACT

A power flow transformer implements power flow control in a transmission line of an n-phase power transmission system, where each phase of the power transmission system has a transmission voltage. The transformer has n secondary windings, where each secondary winding is on a core. The transformer also has n primary windings on the core of each secondary winding for a total of $n^2$ primary windings, where one primary winding from each core is assigned to each phase. For each phase, the primary windings assigned to the phase are coupled in series, and the in-series primary windings receive the transmission voltage of the respective phase of the power transmission system. For each core, each primary winding thereon induces a voltage in the secondary thereon. The induced voltages are summed by the secondary to result in a summed induced voltage. Such summed induced voltage is a compensating voltage for a respective phase.

14 Claims, 27 Drawing Sheets

U.S. PATENT DOCUMENTS

| | | | |
|---|---|---|---|
| 5,402,057 A | 3/1995 | D'Aquila et al. | 323/211 |
| 5,408,171 A | 4/1995 | Eitzmann et al. | 323/258 |
| 5,545,971 A | 8/1996 | Gomez et al. | 323/259 |
| 5,654,627 A | 8/1997 | Shimazu et al. | 323/258 |
| 5,754,035 A * | 5/1998 | Sen | 323/207 |
| 5,907,236 A | 5/1999 | James | 323/255 |
| 5,969,511 A | 10/1999 | Asselman et al. | 323/258 |
| 6,335,613 B1 * | 1/2002 | Sen et al. | 323/216 |

OTHER PUBLICATIONS

Gyugyi, Schauder and Sen, SSSC–Static Synchronous Series Compensator: A Solid–State Approach to the Series Compresation of Transmission Lines, IEEE Transactions on Power Delivery, vol. 12, No. 1, Jan. 1997.

Sen and Stachy, UPFC—Unified Power Flow Controler: Theory, Modeling and Applications, IEEE Transactions on Power Delivery, vol. 13, No. 4, Oct. 1998.

* cited by examiner

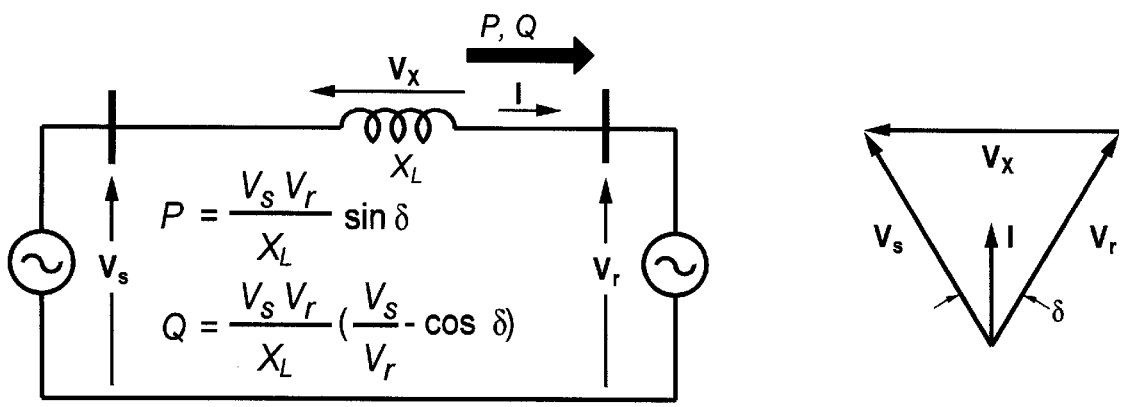
FIG. 1 – PRIOR ART

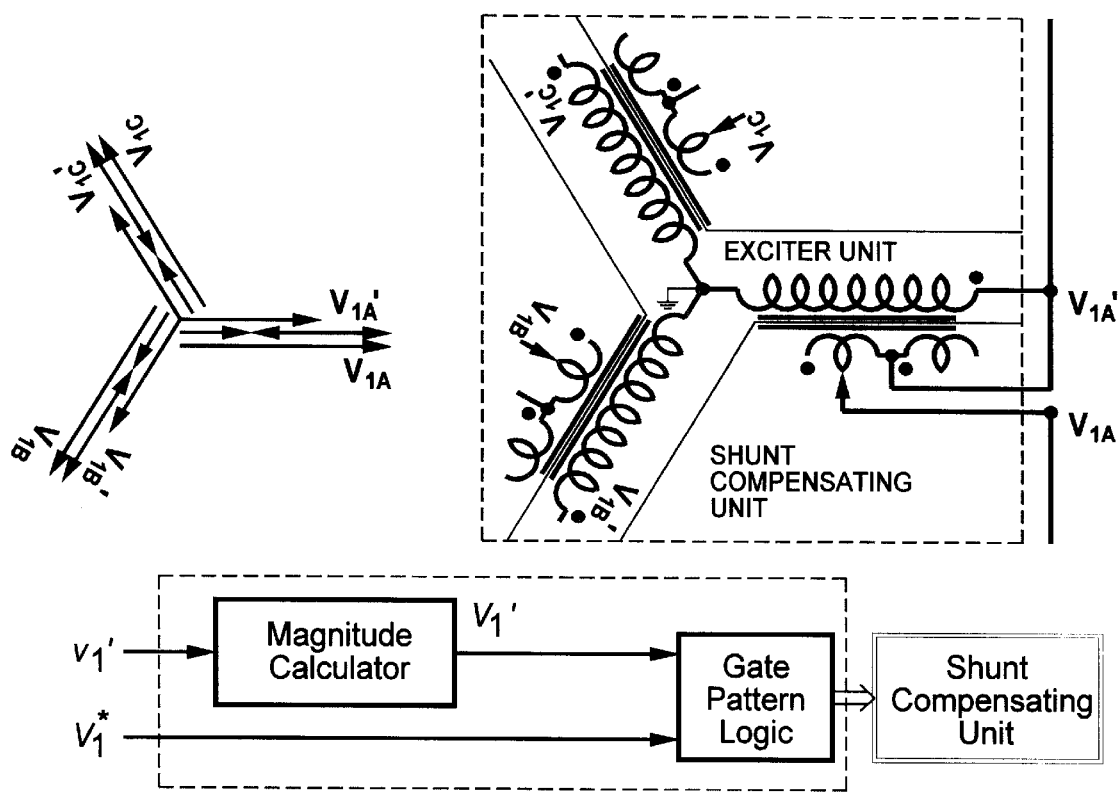
FIG. 2 – PRIOR ART

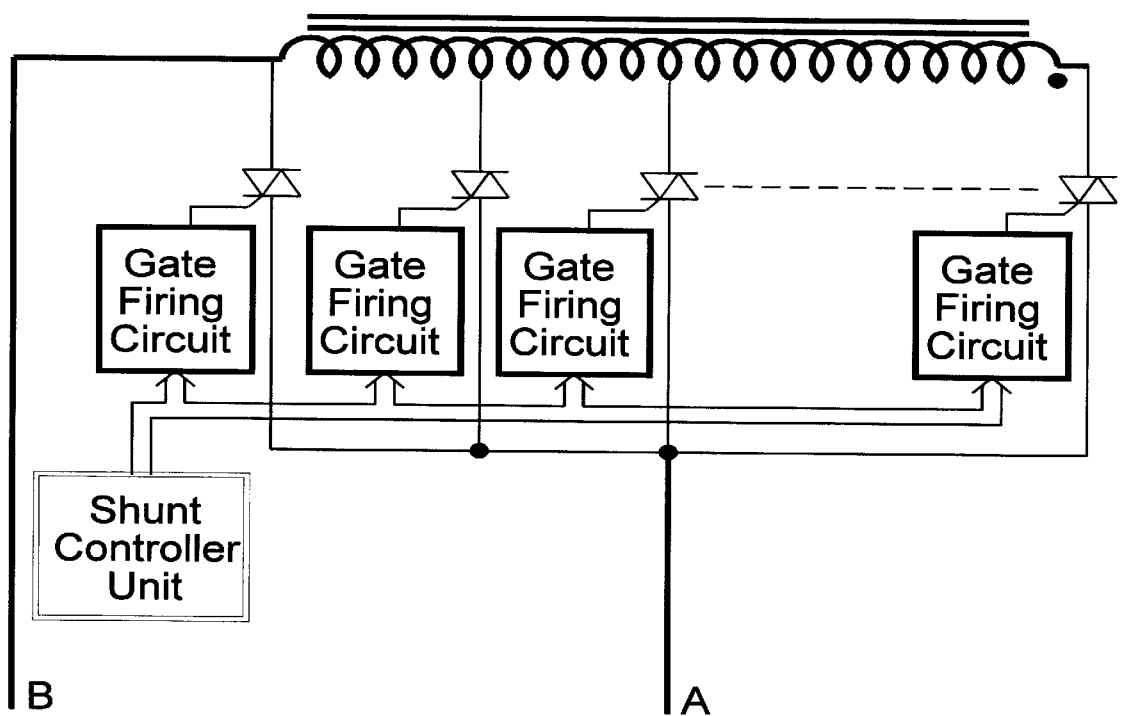
FIG. 3 – PRIOR ART

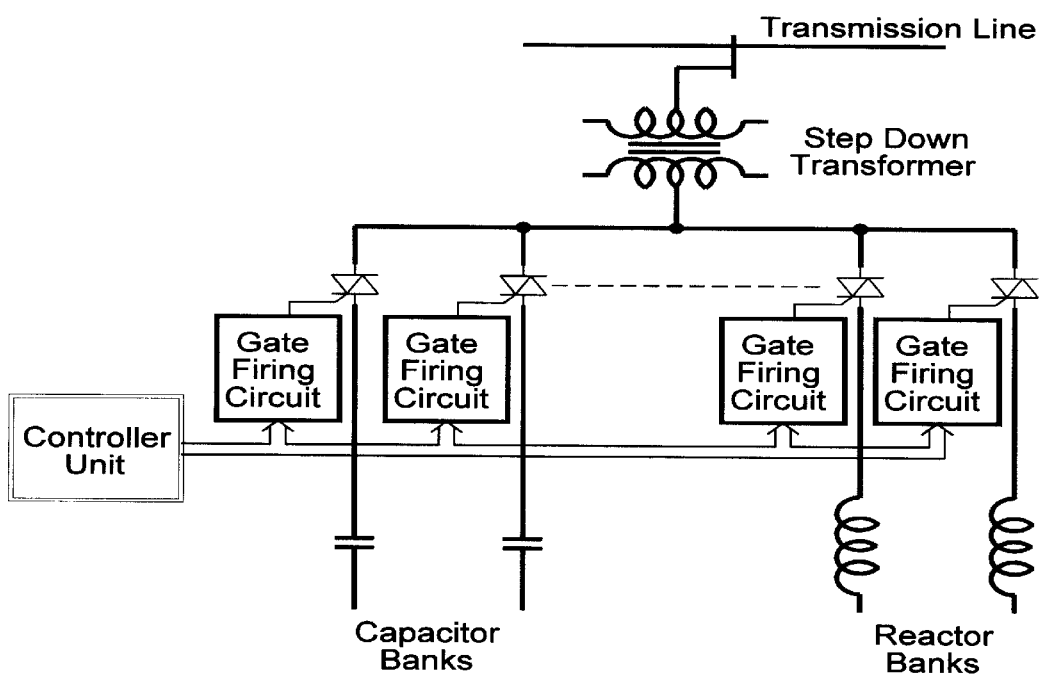
FIG. 4 – PRIOR ART

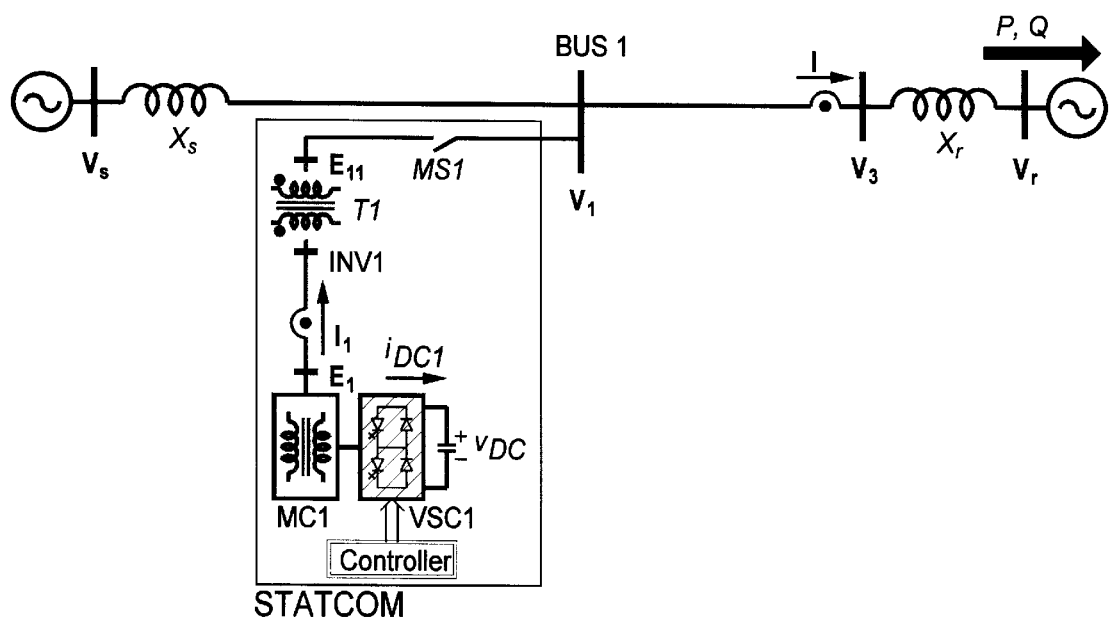
FIG. 5 – PRIOR ART

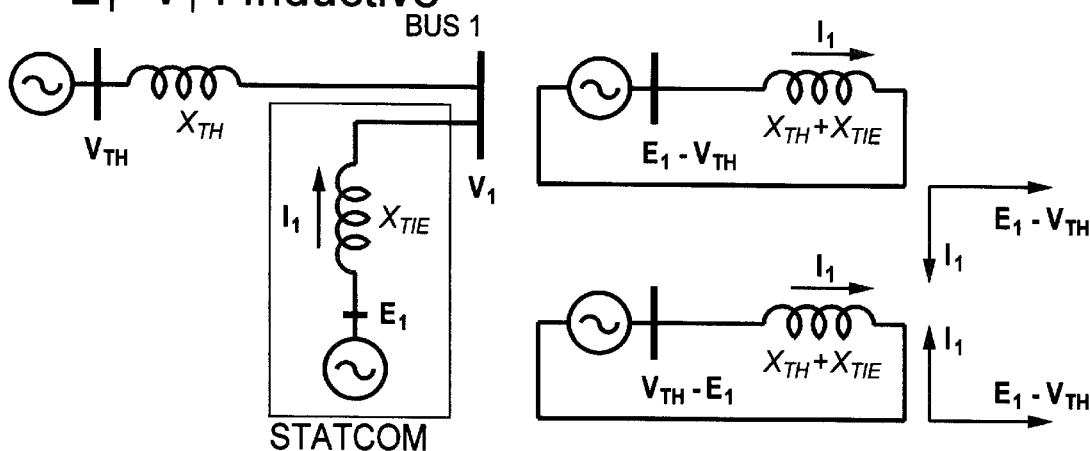
FIG. 6 – PRIOR ART

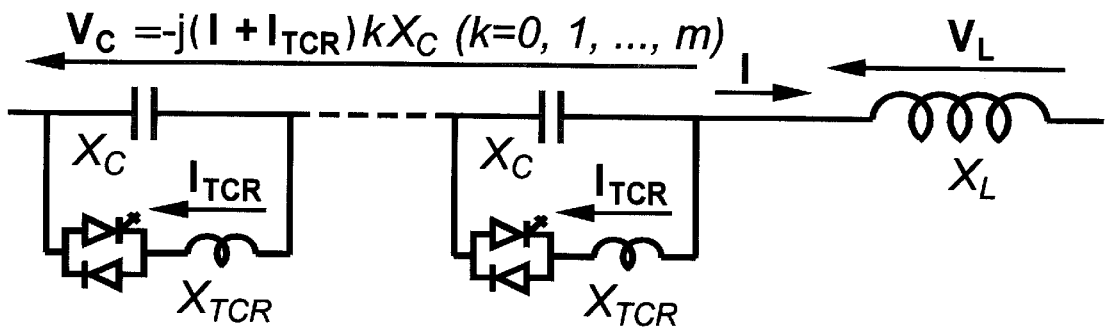
FIG. 7 – PRIOR ART

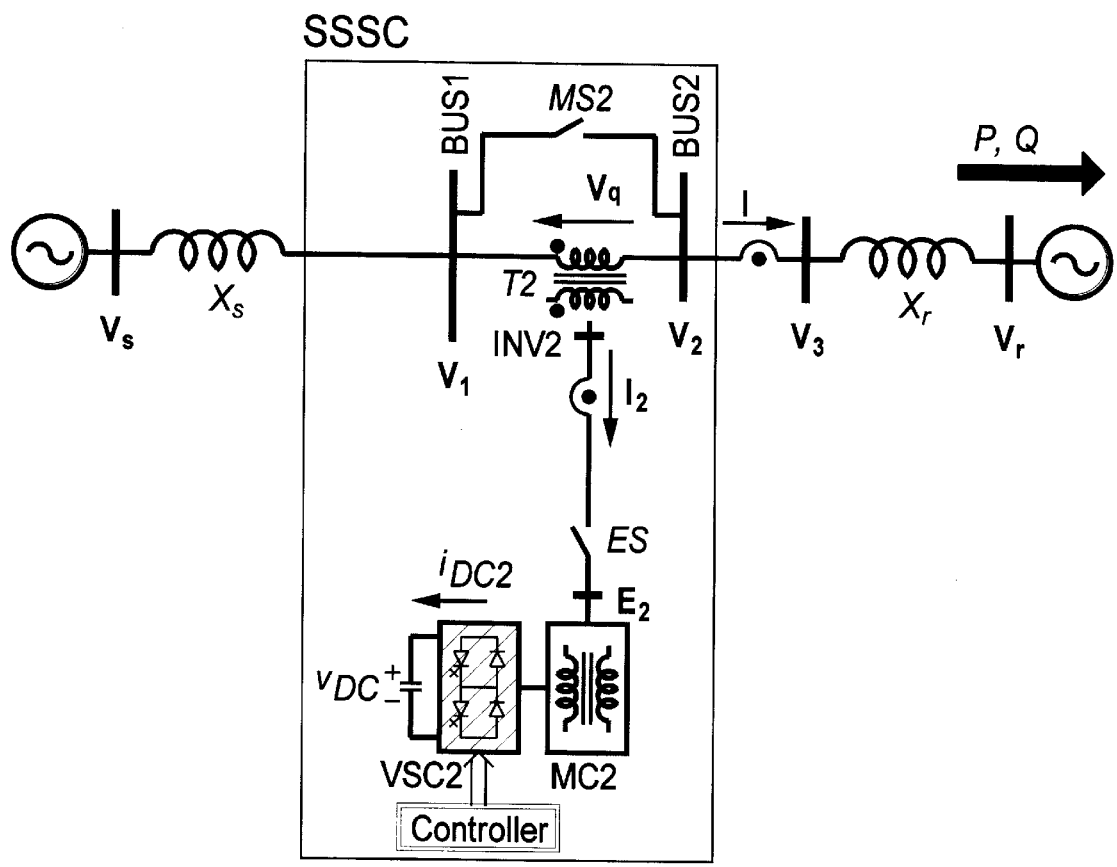
FIG. 8 – PRIOR ART

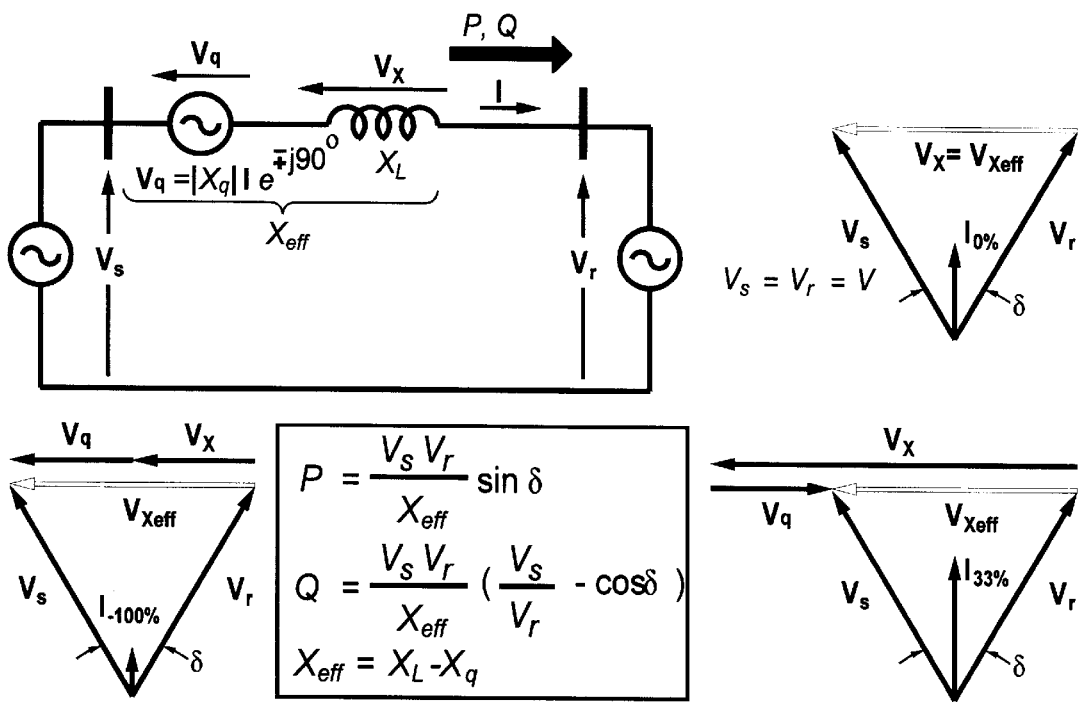
FIG. 9 – PRIOR ART

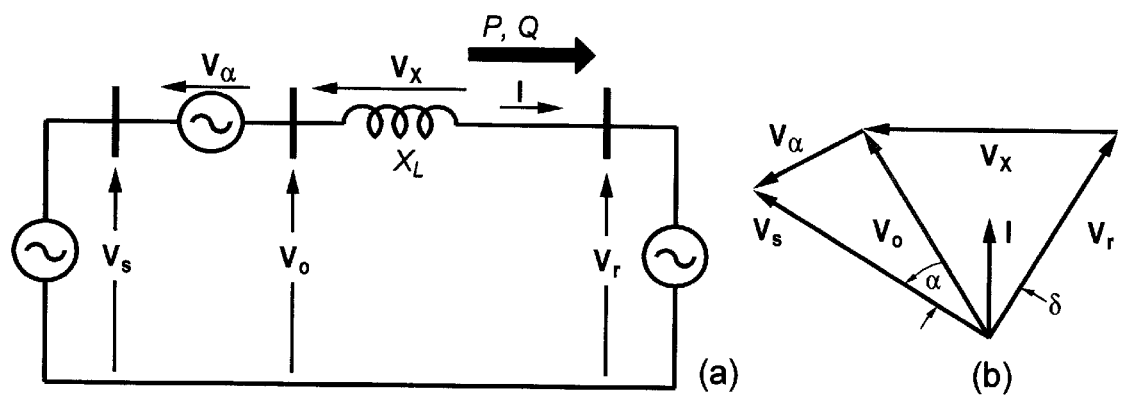
FIG. 10a – PRIOR ART

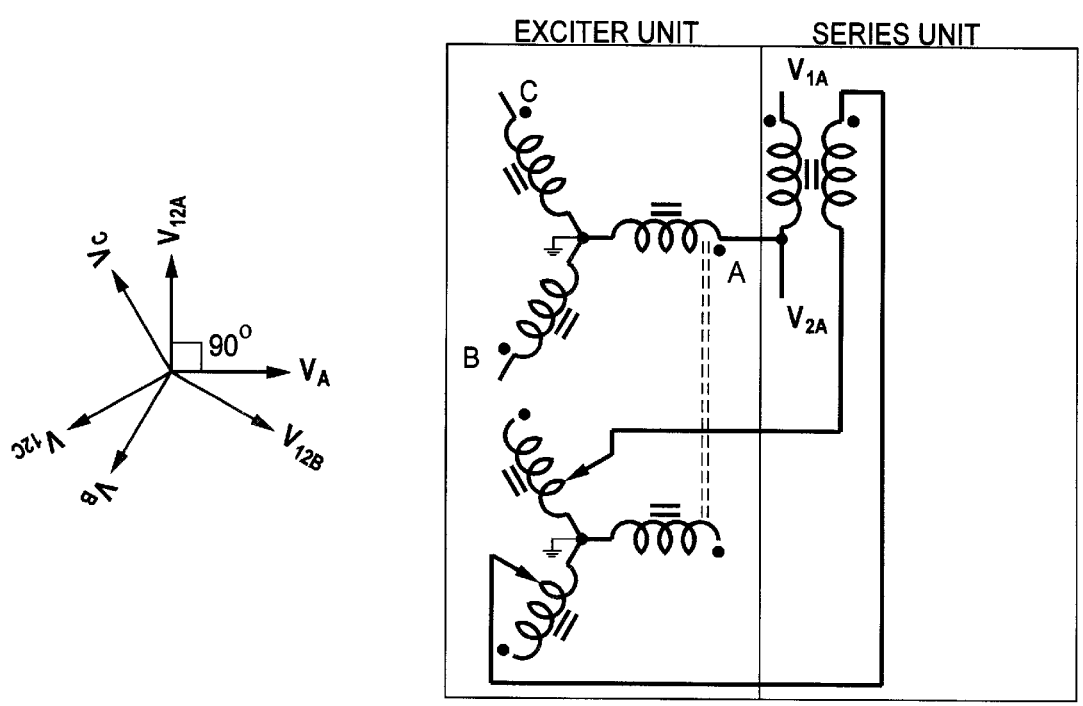
FIG. 10b – PRIOR ART

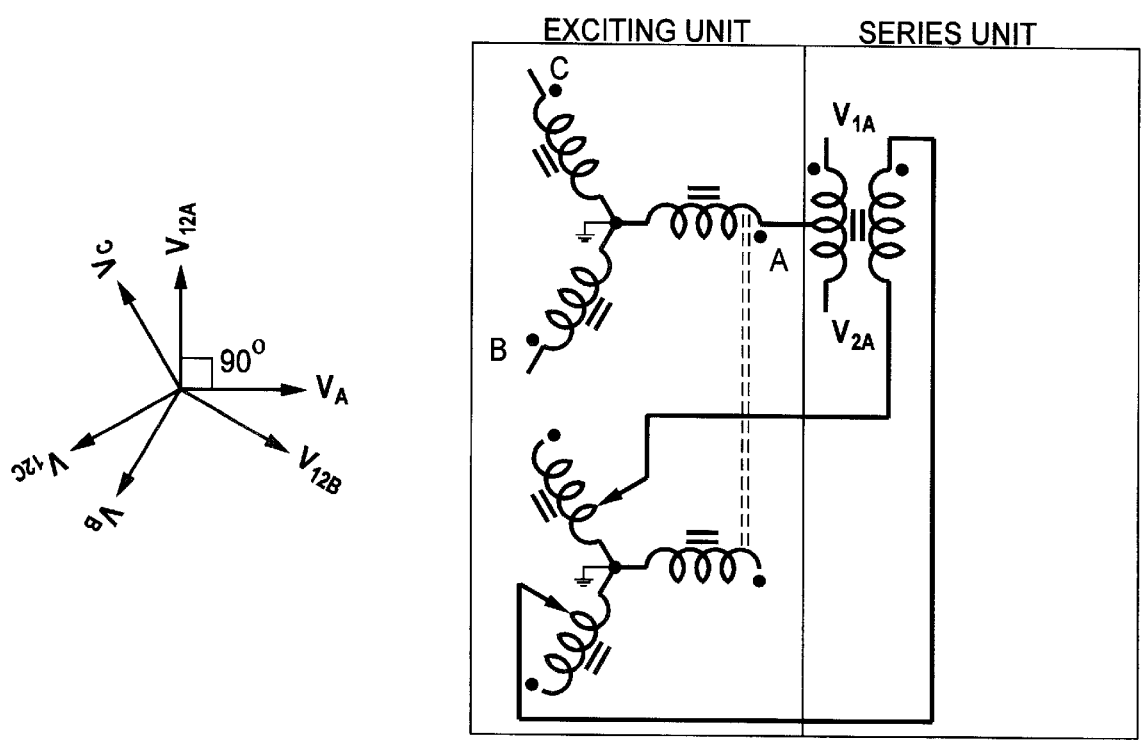
FIG. 10c – PRIOR ART

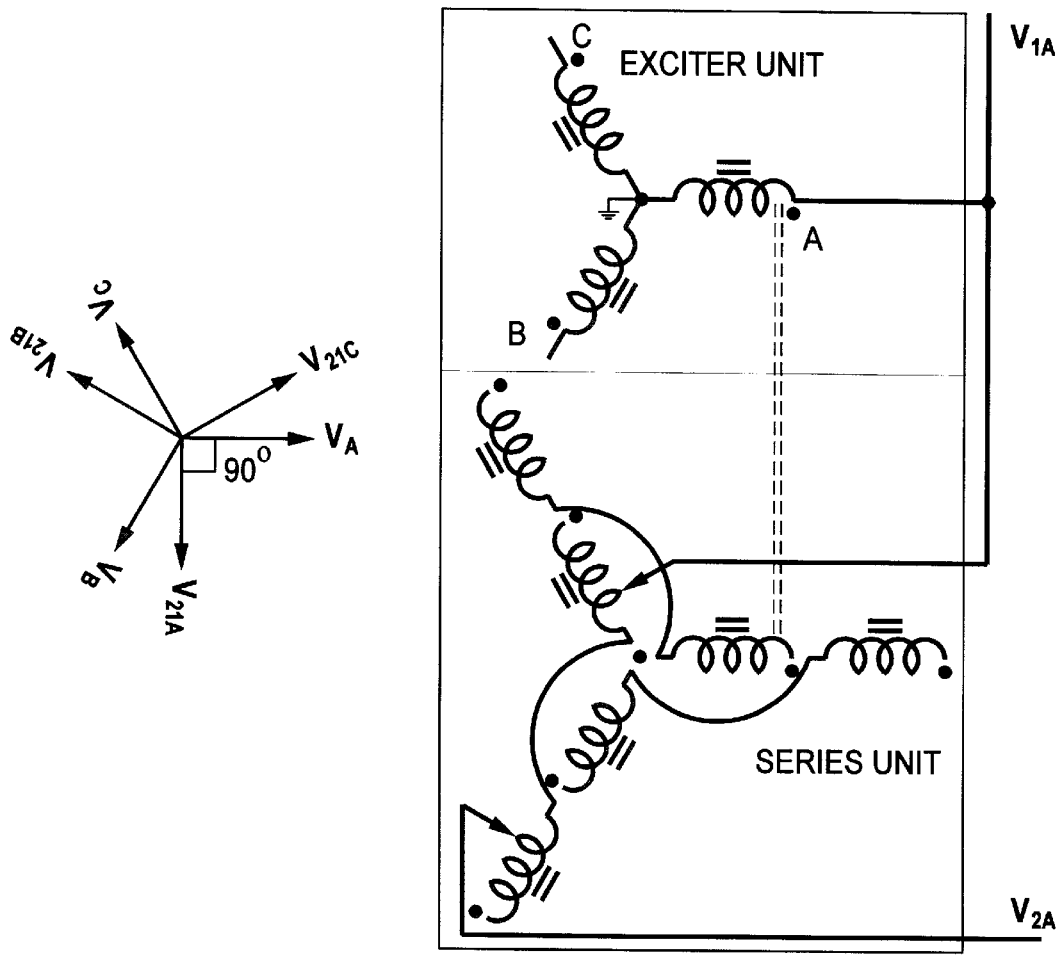
FIG. 10d – PRIOR ART

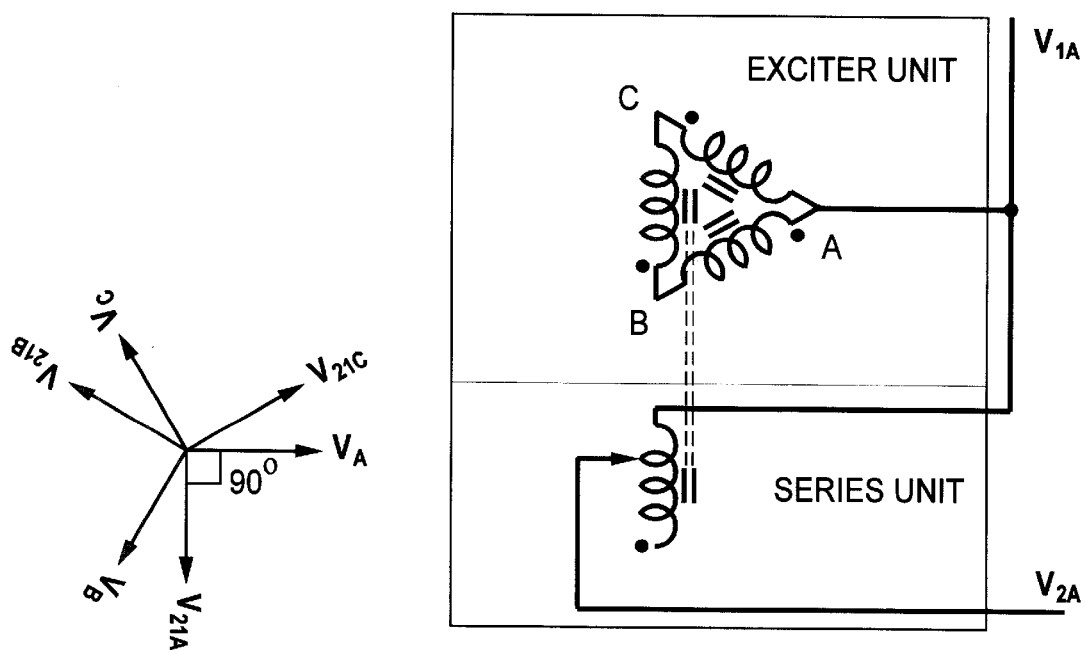
FIG. 10e – PRIOR ART

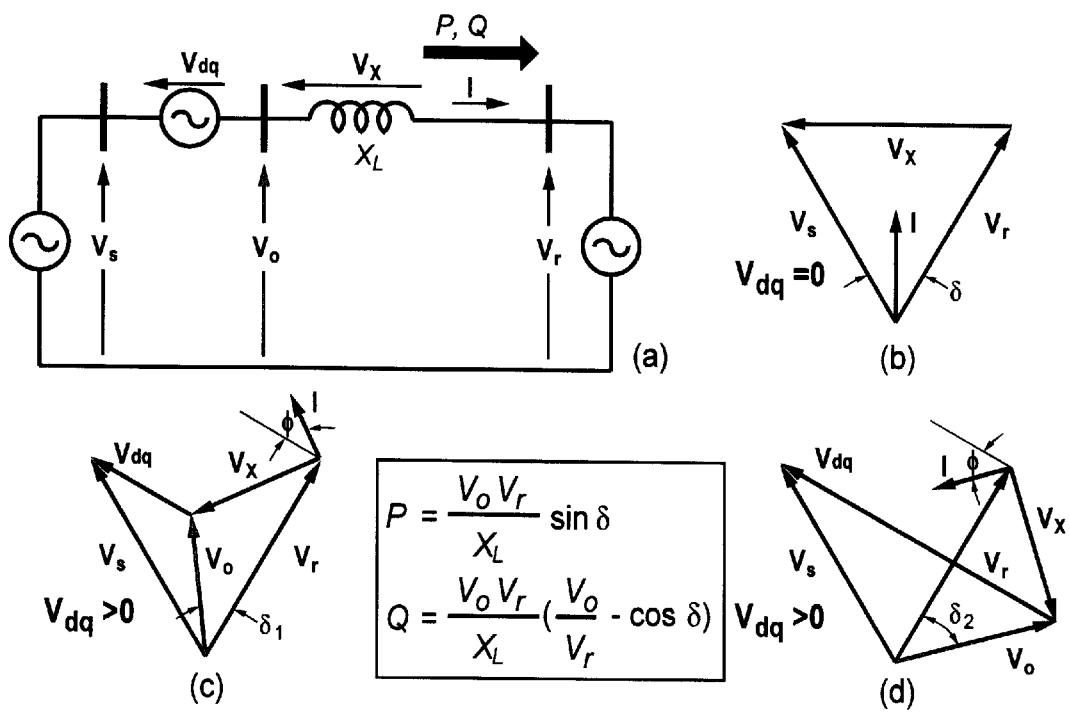
FIG. 11 – PRIOR ART

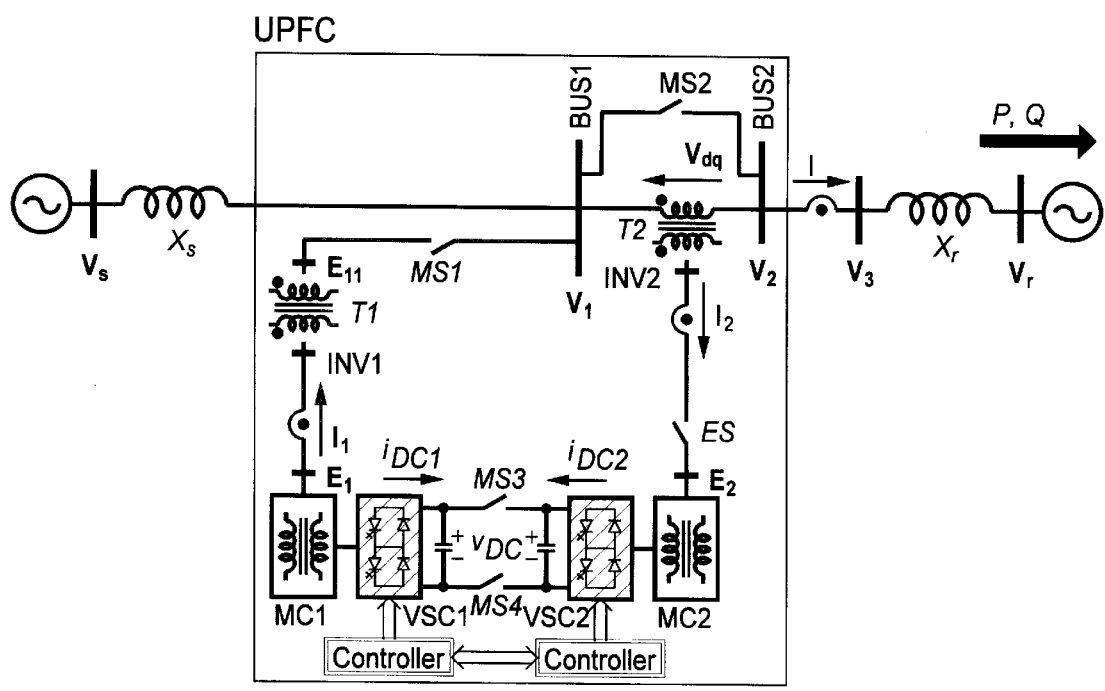
FIG. 12 – PRIOR ART

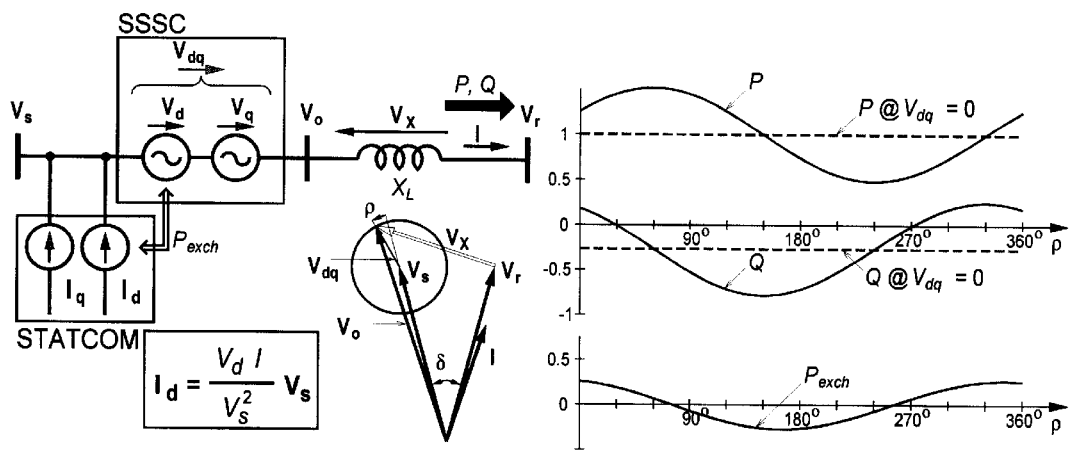
FIG. 13 – PRIOR ART

VERSATILE POWER FLOW TRANSFORMERS FOR COMPENSATING POWER FLOW IN A TRANSMISSION LINE

CROSS-REFERENCE TO RELATED APPLICATIONS

This application is related to and filed concurrently with: U.S. patent application Ser. No. 09/728,985, entitled "VERSATILE POWER FLOW TRANSFORMERS FOR COMPENSATING POWER FLOW IN A TRANSMISSION LINE"; U.S. patent application Ser. No. 09/729,006, entitled "VERSATILE POWER FLOW TRANSFORMERS FOR COMPENSATING POWER FLOW IN A TRANSMISSION LINE"; and U.S. patent application Ser. No. 09/728,978, entitled "VERSATILE POWER FLOW TRANSFORMERS FOR COMPENSATING POWER FLOW IN A TRANSMISSION LINE", each of which is hereby incorporated by reference.

FIELD OF THE INVENTION

The present invention relates to power flow transformers that compensate power flow in a transmission line. More particularly, the present invention relates to a power flow transformer that is simple, versatile, and relatively inexpensive.

BACKGROUND OF THE INVENTION

Electric power flow through an alternating current transmission line is a function of the line impedance, the magnitudes of the sending-end and the receiving-end voltages, and the phase angle between such voltages, as shown in FIG. 1. The impedance of the transmission line is typically inductive; accordingly, power flow can be decreased by inserting an additional inductive reactance in series with the transmission line, thereby increasing the effective reactance of the transmission line between its two ends. The power flow can also be increased by inserting an additional capacitive reactance in series with the transmission line, thereby decreasing the effective reactance of the transmission line between its two ends. The indirect way to emulate an inductive or a capacitive reactance is to inject a voltage in quadrature with the prevailing line current.

The direct method of voltage regulation of a transmission line is to add a compensating voltage vectorially in- or out-of-phase with the voltage of the transmission line at the point of connection. The indirect method to regulate the line voltage is to connect a capacitor or an inductor in shunt with the transmission line. A shunt-connected capacitor raises the line voltage by way of generated reactive power. A shunt-connected inductor absorbs reactive power from the line and thus lowers the voltage. The indirect way to implement a shunt capacitor or inductor is to generate a voltage in phase with the line voltage at the point of connection and connect the voltage source to the line through an inductor. Through control action, the generated voltage can be made higher or lower than the line voltage in order to emulate a capacitor or an inductor. Lastly, inserting a voltage in series with the line and in quadrature with the phase-to-neutral voltage of the transmission line can change the effective phase angle of the line voltage.

In order to regulate the voltage at any point in a transmission line, an in-phase or an out-of-phase voltage in series with the line is injected. FIG. 2 shows the shunt compensating transformer scheme for voltage regulation in a transmission line. The exciter unit consists of a three-phase Y-connected primary winding, which is impressed with the initial line voltage, $v_1'$ (i.e., $v_{1A}'$, $v_{1B}'$, and $v_{1C}'$). The shunt-compensating unit consists of a total of six secondary windings (two windings in each phase for a bipolar voltage injection). The line is regulated at a voltage, $v_1$ by adding a compensating voltage, $v_{11'}$, either in- or out-of-phase with the line voltage. The bipolar compensating voltage in any phase is induced in two windings placed on the same phase of the transformer core. To control the shunt compensating unit, a reference voltage $V_1^*$ is fed to a gate pattern logic which monitors the magnitude $V_1'$ of the exciter voltage, $v_1'$, and determines the number of turns necessary on the shunt compensating unit. Based on this calculation, an appropriate thyristor valve is switched on in a tap changer (FIG. 3), which puts the required number of turns in series with the line.

FIG. 3 shows the schematic diagram of a thyristor-controlled tap changer. A transformer winding is tapped at various places. Each of the tapped points is connected to one side of a back-to-back thyristor (triac) switch. The other sides of all the thyristor switches are connected together at point A. Depending on which thyristor is on, the voltage between points A and B can be varied between zero and the full winding voltage with desired steps in between. In a mechanical version of this arrangement, a load tap changer connects with one of a number of taps to give a variable number of turns between the connected tap and one end of the winding.

A Static VAR Compensator (SVC) consists of a series of inductors and capacitors as shown in FIG. 4. SVC compensation is achieved by putting either inductance or capacitance in the circuit through a thyristor switch. The level of compensation is determined by adjusting the conduction angle of the thyristor switch.

A static synchronous compensator (STATCOM) is a voltage source converter (VSC) coupled with a transformer as shown in FIG. 5. Such STATCOM injects an almost sinusoidal current of variable magnitude at the point of connection with a transmission line. Such injected current is almost in quadrature with the line voltage, thereby emulating an inductive or a capacitive reactance at the point of connection with the transmission line.

The STATCOM is connected at BUS 1 of the transmission line, which has an inductive reactance, $X_s$, and a voltage source, $V_s$, at the sending end and an inductive reactance, $X_r$, and a voltage source, $V_r$, at the receiving end, respectively. The STATCOM consists of a harmonic neutralized voltage source converter, VSC1, a magnetic circuit, MC1, a coupling transformer, T1, a mechanical switch, MS1, current and voltage sensors, and a controller. The primary control of VSC1 is such that the reactive current flow through the STATCOM is regulated.

The STATCOM controller operates the VSC such that the phase angle between the VSC voltage and the line voltage is dynamically adjusted so that the STATCOM generates or absorbs desired VAR at the point of connection. FIG. 6 shows a simplified diagram of the STATCOM with a VSC voltage source, $E_1$, and a tie reactance, $X_{TIE}$, connected to a power system with a voltage source, $V_{TH}$, and a Thevenin reactance, $X_{TH}$. When the VSC voltage is higher than the power system voltage, the system "sees" the STATCOM as a capacitive reactance and the STATCOM is considered to be operating in a capacitive mode. Similarly, when the power system voltage is higher than the VSC voltage, the system "sees" the STATCOM as an inductive reactance and the STATCOM is considered to be operating in an inductive mode.

The effective line reactance is varied directly by using either mechanically switched or thyristor switched inductors and capacitors, such as those found in a Thyristor Controlled Series Compensator (TCSC) as shown in FIG. 7. The basic implementation of a TCSC consists of one or a string of capacitor banks, each of which is shunted by a Thyristor Controlled Reactor (TCR). In this arrangement, the current through a TCR, which also circulates through the associated capacitor bank, is varied in order to control the compensating voltage and thus the variable reactance. A STATCOM and the STATCOM model are disclosed in more detail in Sen, *STATCOM—STATic synchronous COMpensator: Theory, Modeling, and Applications,* IEEE Pub. No. 99WM706, hereby incorporated by reference.

A Static Synchronous Series Compensator (SSSC) is a Voltage Source Converter coupled with a transformer as shown in FIG. 8. An SSSC injects an almost sinusoidal voltage, of variable magnitude, in series with a transmission line. This injected voltage is almost in quadrature with the line current, thereby emulating indirectly an inductive or a capacitive reactance, $X_q$, in series with the transmission line as shown in FIG. 9. The compensating reactance, $X_q$, has a positive value when emulating a capacitor and a negative value when emulating an inductor. The effective line reactance, $X_{eff}$, has a positive value when being inductive and a negative value when being capacitive.

The SSSC is connected in series with a simple transmission line, which has an inductive reactance, $X_s$, and a voltage source, $V_s$ at the sending-end and an inductive reactance, $X_r$, and a voltage source, $V_r$, at the receiving-end, respectively. The SSSC consists of a harmonic neutralized Voltage Source Converter, VSC2, a magnetic circuit, MC2, a coupling transformer, T2, a mechanical switch, MS2, one electronic switch, ES, current and voltage sensors, and a controller. The primary function of the SSSC is to inject a voltage in series with the transmission line and in quadrature with the prevailing line current.

FIG. 9 shows a simple power transmission system with an SSSC operated both in inductive and in capacitive modes and the related phasor diagrams. The line current decreases from $I_{0\%}$ to $I_{-100\%}$, when the inductive reactance compensation, $-X_q/X_L$, increases from 0% to 100%. The line current increases from $I_{0\%}$ to $I_{33\%}$, when the capacitive reactance compensation, $X_q/X_L$, increases from 0% to 33%. An SSSC and the SSSC model are disclosed in more detail in Sen, *SSSC—Static Synchronous Series Compensator: Theory, Modeling, and Applications,* IEEE Pub. No. PE-862-PWRD-0-04-1997, hereby incorporated by reference, and in Gyugyi, Schauder, and Sen, *SSSC—Static Synchronous Series Compensator: A Solid-State Approach to the Series Compensation of Transmission Lines,* IEEE Pub. No. 96WM120-6PWRD, also hereby incorporated by reference.

The effective angle of a transmission line is varied by using a Phase Shifting Transformer, which is also known as a Phase Angle Regulator (PAR). A PAR injects a voltage in series with the transmission line and in quadrature with the phase-to-neutral voltage of the transmission line as shown in FIG. 10A. The series injected voltage introduces a phase shift whose magnitude in radian varies with the magnitude of the series injected voltage input where the phase-to-neutral voltage of the transmission line is the base voltage. In a typical configuration, a PAR consists of two transformers (FIG. 10B). The first transformer in the exciter unit is a regulating transformer that is shunt connected with the line. The first, regulating transformer primary windings are excited from the line voltage and a voltage is induced in the secondary windings. A voltage with variable magnitude and in quadrature with the line voltage is generated from the phase-to-phase voltage of the induced voltage of the first transformer using taps. For series injection of this voltage, an electrical isolation is necessary.

The second transformer in the series unit is a series transformer that is excited from the phase-to-phase voltage of the regulating transformer and its induced voltage is connected in series with the line. Since the series injection voltage is only a few percent of the line voltage, the series transformer can be a step-down transformer. The primary winding of the series transformer as well as the secondary winding of the regulating transformer can be high voltage and low current rated so that the taps can operate normally at low current and can ride through high fault current.

In an alternate arrangement as shown in FIG. 10C, the PAR regulates the angle of the transmission line voltage using two transformers maintaining equal lengths of phasors $V_1$ and $V_2$. In another arrangement as shown in FIG. 10D, there may be two series connected windings, which are dedicated for inducing a compensating voltage for series injection in each phase. In this way, there are three pairs of electrically isolated windings for the series unit (one pair for each phase) and three windings for the exciter unit. This arrangement uses only a single-core three-phase transformer. However, the taps carry high line current as well as even higher fault current. The capability of the PAR shown in FIG. 10D can be achieved in an alternate arrangement shown in FIG. 10E where the exciter unit is delta-connected, which offers fewer windings and no ground connection.

The characteristics of mechanically switched and Thyristor-controlled Power Flow Controllers are such that each controller can control only one of the three transmission parameters (voltage, impedance, and angle). Therefore, changing one parameter affects both the real and the reactive power flow in the transmission line.

The desired operation of an ideal power flow controller is described below. FIG. 11A shows a single line diagram of a simple transmission line with an inductive reactance, $X_L$, and a series insertion voltage, $V_{dq}$, connecting a sending-end voltage source, $V_s$, and a receiving-end voltage source, $V_r$, respectively. The voltage across the transmission line reactance, $X_L$, is $V_X=V_s-V_r-V_{dq}=IX_L$ where I is the current in the transmission line. Changing the insertion voltage, $V_{dq}$, in series with the transmission line can change the voltage, $V_X$, across the transmission line and, consequently, the line current and the power flow in the line will change.

Consider the case where $V_{dq}=0$ (FIG. 11, section (b)). The transmission line sending-end voltage, $V_s$, leads the receiving-end voltage, $V_r$, by an angle $\delta$. The resulting current in the line is I; the real and the reactive power flow at the receiving end are P and Q, respectively. With an injection of $V_{dq}$ in series with the transmission line, the transmission line sending-end voltage, $V_o$ still leads the receiving-end voltage, $V_r$, but by a different angle $\delta_1$ (FIG. 11, section (c)). The resulting line current and power flow change, as shown. With a larger amount of $V_{dq}$ injected in series with the transmission line, the transmission line sending-end voltage, $V_o$, now lags the receiving-end voltage, $V_r$, by an angle $\delta_2$ (FIG. 11, section (d)). The resulting line current and the power flow now reverse. Notice that the injected series voltage, $V_{dq}$, is at any angle, $\Phi$, with respect to the line current, I. This necessitates the series injected voltage to exchange both real and reactive power with the transmission line, which emulates, in series with the line, a capacitor or an inductor and a positive resistor that absorbs real power from the line or a negative resistor that delivers real power to the line. The result is that the real and the reactive power flow in the line can be regulated selectively. Recall an SSSC injects a voltage in quadrature with the line current and, therefore, affects both the real and the reactive power flow in the line simultaneously.

For a desired amount of real and reactive power flow in a line, a single compensating voltage with a variable magnitude and at any angle with respect to the line current should be injected in series with the line. The compensating voltage, being at any angle with the prevailing line current, emulates in series with the transmission line a capacitor, an inductor, a positive resistor that absorbs real power from the line and a negative resistor that delivers real power to the line. Since the line current is at any angle with respect to the line voltage, the compensating voltage is also at any angle with respect to the line voltage. Note that the necessary condition to selectively regulate the real and reactive power flow in the line is that the series injected voltage must be at any angle with respect to the prevailing line current. Also note that the series injected voltage in FIG. 9 is at some arbitrary angle with respect to the line voltage, $V_s$, but the line current is always in quadrature with the series injected voltage, which affects both the real and the reactive power flow in the line at the same time.

When the STATCOM of FIG. 5 and the SSSC of FIG. 8 operate as stand-alone compensators, they exchange almost exclusively reactive power at their terminals. While operating both the VSCs together as a unified power flow controller (UPFC) with a common DC link capacitor, as shown in FIG. 12, the exchanged power at the terminals of each inverter can be reactive as well as real. The exchanged real power at the terminals of one VSC with the line flows to the terminals of the other VSC through the common DC link capacitor. The DC capacitor voltage is defined by the reactive current flowing through the STATCOM. The variable series injected voltage is derived from the DC capacitor voltage and can be at any angle with respect to the line current.

FIG. 12 shows a UPFC connected in series with a simple transmission line, which has an inductive reactance, $X_s$, and a voltage source, $V_s$ at the sending-end and an inductive reactance, $X_r$, and a voltage source, $V_r$, at the receiving-end, respectively. The UPFC consists of two harmonic neutralized voltage source converters, VSC1 and VSC2, two magnetic circuits, MC1 and MC2, two coupling transformers, T1 and T2, four mechanical switches, MS1, MS2, MS3, and MS4, one electronic switch, ES, current and voltage sensors, and a controller. The VSCs are connected through a common DC link capacitor. The STATCOM is operated by regulating the reactive current flow through it. The SSSC is operated by injecting a voltage in series with the transmission line.

FIG. 13 shows a basic UPFC model, which consists of a STATCOM and an SSSC. The SSSC injects a voltage, $V_{dq}$, in series with the transmission line, which, in turn, changes the voltage, $V_x$, across the transmission line and hence the current and the power flow through the transmission line change. FIG. 13 also shows a phasor diagram of a simple power transmission system, defining the relationship between the sending-end voltage, $V_s$, the receiving-end voltage, $V_r$, the voltage across $X_L$, $V_X$, and the inserted voltage, $V_{dq}$, with controllable magnitude ($0 \leq V_{dq} \leq V_{dqmax}$) and angle ($0 \leq \rho \leq 360°$). The inserted voltage, $V_{dq}$, is added to the fixed sending-end voltage, $V_s$, to produce the effective sending-end voltage, $V_o = V_s + V_{dq}$. The difference, $V_o - V_r$, provides the compensated voltage, $V_X$, across $X_L$. As angle $\rho$ is varied over its full 360° range, the end of phasor $V_{dq}$ moves along a circle with its center located at the end of phasor $V_s$. The rotation of phasor $V_{dq}$ with angle $\rho$ modulates both the magnitude and the angle of phasor $V_X$ and, therefore, both the transmitted real power, P, and the reactive power, Q, vary with $\rho$ in a sinusoidal manner. The phase angle, $\phi$, (FIG. 11, sections (c) and (d)) between the injected voltage, $V_{dq}$, and the line current, I, can vary between 0 and $2\pi$. The component of the injected voltage, which is in or out of phase with the line current, emulates a positive or negative resistor in series with the transmission line. The remaining component, which is in quadrature with the line current, emulates an inductor or a capacitor in series with the transmission line. This process, of course, requires the compensating voltage, $V_{dq}$, to deliver and absorb both real and reactive power, $P_{exch}$ and $Q_{exch}$, which are also sinusoidal functions of angle $\rho$ ($P_{exch}$ being shown in FIG. 13 since only the real power flows through the DC link capacitor). The exchanged real power, $P_{exch}$, and reactive power, $Q_{exch}$, by the SSSC with the line are $$P_{exch} = V_{dq} \cdot I = V_{dq} I \cos \phi = V_d I,$$

and $$Q_{exch} = V_{dq} \times I = V_{dq} I \sin \phi = V_q I.$$

Only the exchanged real power, $P_{exch}$, with the line flows through the STATCOM. This real power flow through the STATCOM results in a corresponding real current, $I_d$, flow which is either in-phase or out-of-phase with the line voltage. The loading effect of such real current $I_d$ on the power system network may be compensated by the independent control of the reactive current flow through the STATCOM. This reactive or quadrature component, $I_q$, which is in quadrature with the line voltage, emulates an inductive or a capacitive reactance at the point of connection with the transmission line. A UPFC and the UPFC model are disclosed in more detail in Sen and Stacey, *UPFC—Unified Power Flow Controller: Theory, Modeling, and Applications,* IEEE Pub. No. PE-282-PWRD-0-12-1997, hereby incorporated by reference.

While the PAR of FIGS. 10A–10E and the UPFC of FIG. 12 are useful schemes for power flow control in a transmission line of a power transmission system, it is to be recognized that such schemes are deficient in such areas as versatility, simplicity, and relative cost. Accordingly, a need exists for a power flow control scheme that is in fact more versatile, simpler, and relatively inexpensive.

SUMMARY OF THE INVENTION

In the present invention, the aforementioned need is satisfied by a power flow transformer (PFT) based on the traditional technologies of transformers and tap changers. By using a PFT, one can selectively control the real and the reactive power flow in a line and regulate the voltage of the transmission line. Such PFT generates a compensating voltage of line frequency for series injection with a transmission line. Such compensating voltage is extracted from the line voltage and is of variable magnitude and at any angle with respect to the line voltage. The compensating voltage is also at any angle with respect to the prevailing line current, which emulates, in series with the line, a capacitor, an inductor, a positive resistor that absorbs real power from the line, or a negative resistor that delivers real power to the line. Accordingly, the real and the reactive power flow in a transmission line can be regulated selectively.

In one embodiment of the present invention, a power flow transformer implements power flow control in a transmission line of an n-phase power transmission system, where each phase of the power transmission system has a transmission voltage. The transformer has n secondary windings, where each secondary winding is on a core. The transformer also has n primary windings on the core of each secondary winding for a total of $n^2$ primary windings, where one primary winding from each core is assigned to each phase.

For each phase, the primary windings assigned to the phase are coupled in series, and the in-series primary windings receive the transmission voltage of the respective phase of the power transmission system. For each core, each primary winding thereon induces a voltage in the secondary thereon. The induced voltages are summed by the secondary to result in a summed induced voltage. Such summed induced voltage is a compensating voltage for a respective phase.

Generally, in the PFT, regulation of a transmission line voltage is achieved by adjusting the number of turns in a nine-winding set by way of mechanical or solid-state tap changers. Although mechanical tap changers are quite adequate for most utility applications, dynamic performance can be improved if need be by employing solid-state tap changers such as thyristor-controlled switches.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 1 is a schematic diagram showing an elementary power transmission system;

FIG. 2 is a schematic diagram showing a shunt compensating transformer and its control that may be employed in connection with the power transmission system of FIG. 1;

FIG. 3 is a schematic diagram showing a thyristor-controlled tap changer that may be employed to control the transformer of FIG. 2;

FIG. 4 is a schematic diagram showing a thyristor-controlled static VAR compensator that may be employed in connection with the power transmission system of FIG. 1;

FIG. 5 is a schematic diagram showing a static synchronous compensator (STATCOM) that may be employed in connection with the power transmission system of FIG. 1;

FIG. 6 is a schematic diagram showing the static synchronous compensator of FIG. 5 operating in capacitive and inductive modes;

FIG. 7 is a schematic diagram showing a thyristor-controlled series compensator (TCSC) employing a string of m series capacitor banks, each with a parallel-connected thyristor-controlled reactor, that may be employed in connection with the power transmission system of FIG. 1;

FIG. 8 is a schematic diagram showing a static synchronous series compensator (SSSC) that may be employed in connection with the power transmission system of FIG. 1;

FIG. 9 is a schematic diagram showing the static synchronous series compensator of FIG. 8 operated in inductive and capacitive modes, and the related phasor diagrams;

FIG. 10a is a schematic diagram showing power transmission control by phase angle regulator in connection with the power transmission system of FIG. 1;

FIG. 10b is a schematic diagram showing the phase angle regulator scheme of FIG. 10a with two transformers;

FIG. 10c is a schematic diagram showing the phase angle regulator scheme of FIG. 10a with two transformers maintaining equal lengths of phasors $v_1$ and $v_2$;

FIG. 10d is a schematic diagram showing the phase angle regulator scheme of FIG. 10a with one transformer;

FIG. 10e is a schematic diagram showing the phase angle regulator scheme of FIG. 10a with one transformer and no ground connection;

FIG. 11 is a schematic diagram showing the operation of an ideal power flow controller and related phasor diagrams;

FIG. 12 is a schematic diagram showing a unified power flow controller (UPFC) that may be employed in connection with the power transmission system of FIG. 1;

FIG. 13 is a schematic diagram showing a basic unified power flow controller model in connection with the unified power flow controller of FIG. 12;

DETAILED DESCRIPTION OF PREFERRED EMBODIMENTS

Versatile Power Flow Transformer (VPFT)

Figure 14:
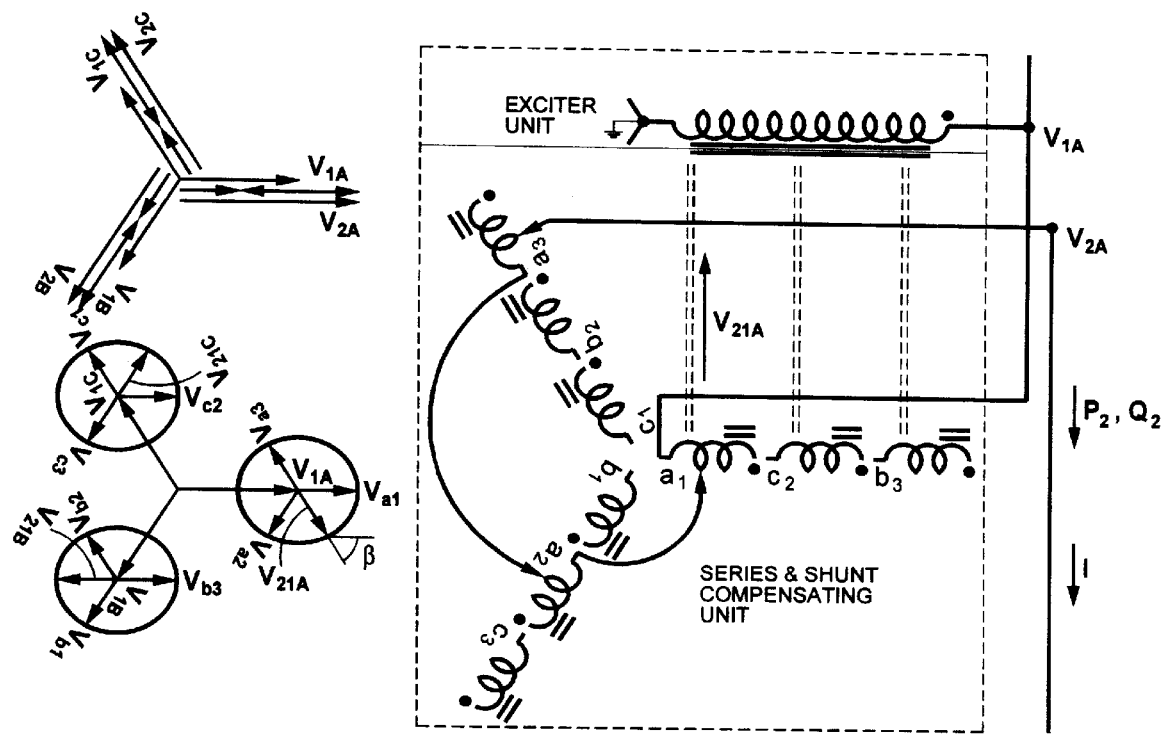
FIG. 14 is a schematic diagram showing a versatile power flow transformer (VPFT) in accordance with one embodiment of the present invention.

Referring now to FIG. 14, a Versatile Power Flow Transformer (VPFT) is shown for implementing power flow control in a transmission line of a power transmission system in accordance with one embodiment of the present invention. As shown, in the VPFT, the line voltage is applied across the primary windings 1A, 1B, 1C in the exciter unit (only winding 1A being shown). Each primary winding has three secondary windings in series, for a total of nine secondary windings—a1, c2 and b3 on the core of A-phase; b1, a2 and c3 on the core of B-phase; and c1, b2 and a3 on the core of C-phase. As seen, a compensating voltage for any phase is derived from the vectorial sum of the voltages induced in a three-phase winding set—a1, a2 and a3 for injection in A-phase; b1, b2 and b3 for injection in B-phase; and c1, c2 and c3 for injection in C-phase. Importantly, a tap is employed on each of the nine secondary windings so that each entity in each vectorial sum can be individually magnitudally varied. Each tap may be a mechanical or solid-state tap changer such as the tap changer of FIG. 3, e.g., although other types of taps may be employed without departing from the spirit and scope of the present invention.

For example, and more specifically, the voltage $V_{21A}$ (shown) is the sum of at least a tapped portion of the voltage across a1 as derived from A-phase, at least a tapped portion of the voltage across a2 as derived from B-phase, and at least a tapped portion of the voltage across a3 as derived from C-phase:

$$V_{21A} = \%x\ a1 + \%y\ a2 + \%z\ a3;$$

and voltage $V_{21A}$ is injected as a compensating voltage in line with $V_{1A}$ to produce compensated voltage $V_{2A}$:

$$V_{2A} = V_{21A} + V_{1A}.$$

Compensating voltages $V_{21B}$ for the B-phase and $V_{21C}$ for the C-phase are similarly produced:

$$V_{21B} = \%x\ b1 + \%y\ b2 + \%z\ b3;$$

$$V_{2B} = V_{21B} + V_{1B}.$$

$$V_{21C} = \%x\ c1 + \%y\ c2 + \%z\ c3;$$

$$V_{2C} = V_{21C} + V_{1C}.$$

Notably, a1, b1, and c1 should be substantially identical; a2, b2, and c2 should be substantially identical; and a3, b3, and c3 should be substantially identical. In addition, each of %x, %y, and %z should be substantially identical across the phases of the VPFT. Accordingly, the magnitude of the produced $V_{21A}$, $V_{21B}$, and $V_{21C}$ should be substantially identical; and $V_{21A}$, $V_{21B}$, and $V_{21C}$ should be substantially 120 degrees out of phase with each other, assuming that $V_{1A}$, $V_{1B}$, and $V_{1C}$ are substantially 120 degrees out of phase with each other. Accordingly, the transmission lines A, B, and C as compensated are substantially in balance. Nevertheless, non-identical variations of any of the aforementioned values may be employed without departing from the spirit and scope of the present invention if deemed necessary and/or appropriate.

Figure 15:
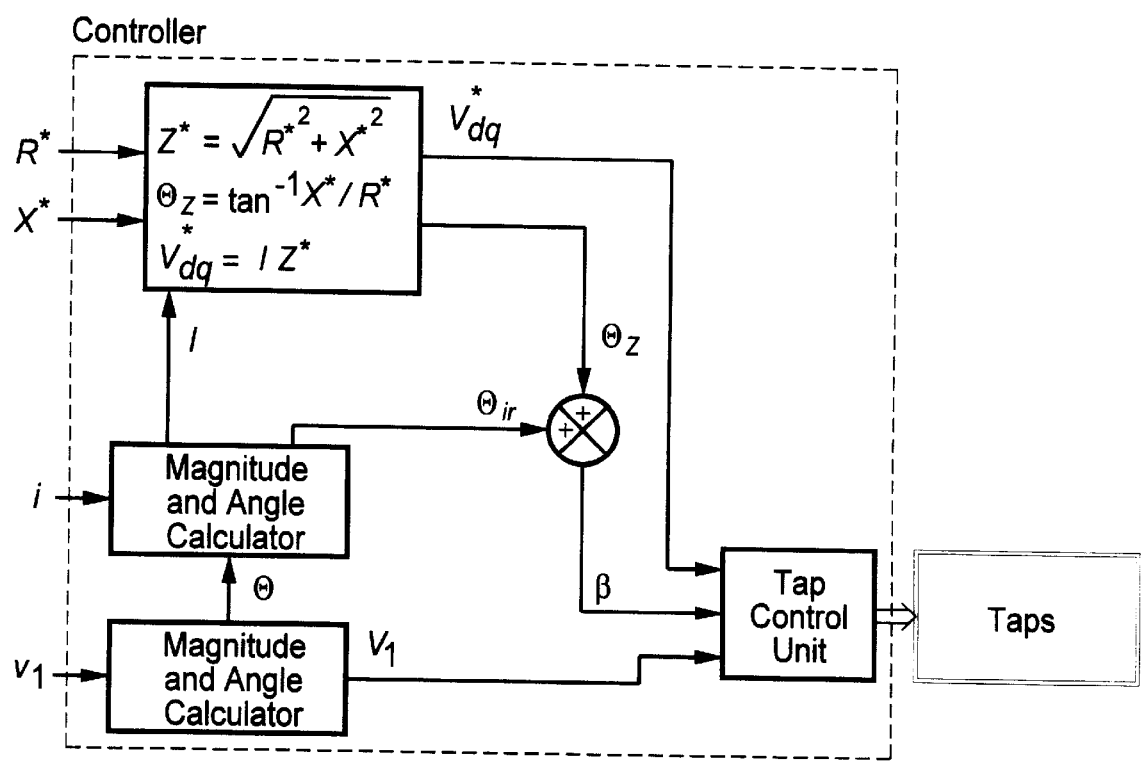
FIG. 15 is a schematic diagram showing a control block diagram for impedance emulation for use in connection with the transformer of FIG. 14.

FIG. 15 shows a control block diagram of a controller for controlling the series impedance emulation achieved by the VPFT of FIG. 14. The steps performed by such controller in one embodiment of the present invention are as follows. An instantaneous 3-phase set of line voltages, $v_1$, (i.e., $v_{1A}$, $v_{1B}$, $v_{1C}$) is used to calculate the reference angle, $\Theta$, which is phase-locked to the phase a of the line voltage, $v_{1A}$. From an instantaneous 3-phase set of measured line currents, $i$, the magnitude, I, and its relative angle, $\Theta_{ir}$, with respect to the phase-lock-loop angle, $\Theta$, are calculated. From the compensating resistance demand, R*, and the compensating reactance demand, X*, both externally supplied, the demanded impedance's magnitude, Z*, and angle, $\Theta_z$, are calculated. The magnitude, I, of the line current multiplied by the compensating impedance demand, Z*, is the insertion voltage magnitude demand, $V_{dq}^*$. The relative phase angle, $\beta$, of this insertion voltage demand is $\Theta_{ir} + \Theta_z$.

Once the desired series injection voltage, $V_{dq}^*$, and its angle, $\beta$, are defined, the Tap Control Unit in FIG. 15 determines the contribution from each winding of a 3-phase set (a1, a2, and a3 for injection in A-phase; b1, b2, and b3 for injection in B-phase; and c1, c2, and c3 for injection in C-phase) to constitute $V_{dq}^*$. In particular, from knowledge of the magnitude of the exciter voltage, $V_1$, the Tap Control Unit determines the number of turns necessary on each winding of the series-compensating unit. The actual method of such determination is known or should be apparent to the relevant public and therefore need not be discussed herein in any detail. Based on this calculation, the appropriate taps are switched on via an appropriate mechanical or solid state tap changer (see FIG. 3, e.g.), which accordingly put the required number of turns in series with the line. In addition, a VPFT can regulate the line voltage by utilizing the unused portions of the transformer windings as a shunt compensating unit, as will be discussed in more detail below. Of course, other methods of controlling the series impedance emulation achieved by the VPFT of FIG. 14 may be employed without departing from the spirit and scope of the present invention.

Figure 16:
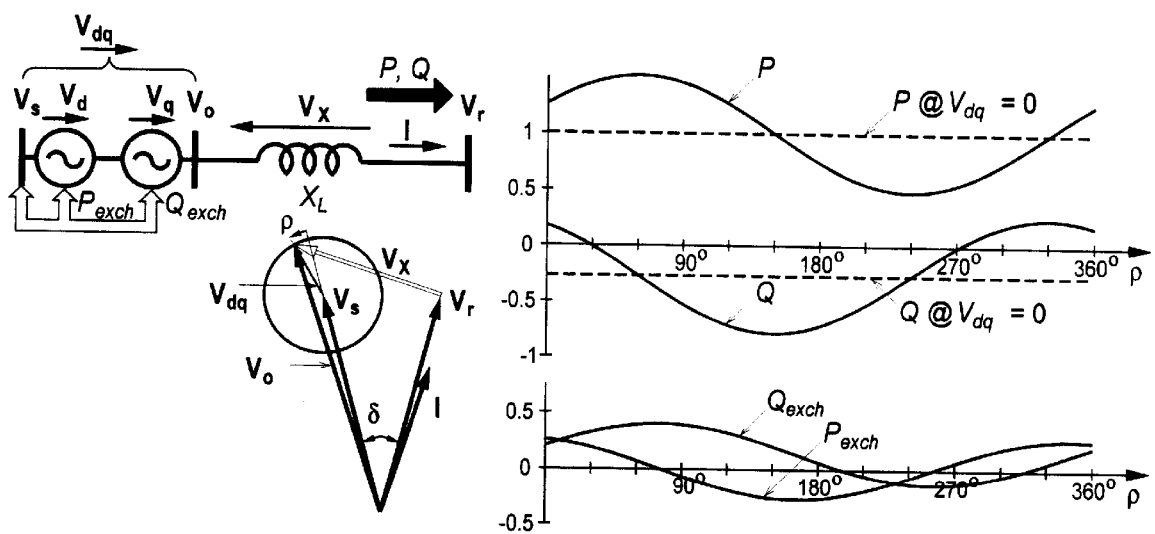
FIG. 16 is a schematic diagram showing a basic versatile power flow transformer model in connection with the versatile power flow transformer of FIG. 14.

FIG. 16 shows a model of the basic VPFT of FIG. 14 as coupled to a simple power transmission system, and also a phasor diagram of the transmission system. As seen, in the system the sending-end voltage is $V_s$, the receiving-end voltage is $V_r$, the voltage across the line impedance $X_L$, is $V_X$, and the inserted voltage is $V_{dq}$, and has a controllable magnitude ($0 \leq V_{dq} \leq V_{dqmax}$) and angle ($0 \leq \rho \leq 360°$). The inserted voltage $V_{dq}$ is added to the fixed sending-end voltage, $V_s$, to produce the effective sending-end voltage, $V_o = V_s + V_{dq}$. The difference, $V_o - V_r$, provides the compensated voltage, $V_X$, across $X_L$. As angle $\rho$ is varied over its full 360° range, the end of phasor $V_{dq}$ moves along a circle with its center located at the end of phasor $V_s$. The rotation of phasor $V_{dq}$ with angle $\rho$ modulates both the magnitude and the angle of phasor $V_x$ and, therefore, both the transmitted real power, P, and the reactive power, Q, vary with $\rho$ in a sinusoidal manner.

This process, of course, requires the compensating voltage, $V_{dq}$, to supply and absorb both real and reactive power, $P_{exch}$ and $Q_{exch}$, which are also sinusoidal functions of angle $\rho$, as shown in FIG. 16. Since the compensating voltage is derived from the line voltage through a transformer action with the primary winding, the exchanged real and reactive power with the line must flow through the primary winding to the line. Since the series injected voltage is, typically, only a few percent of the line voltage, the shunt current would be the same few percent of the line current. The current through the exciter unit has both real and reactive components. The loading effect of these two currents on the power system network is independent of each other as shown. Therefore, if it is desirable to compensate the combined loading effects of the real and the reactive current through exciter unit into the AC system, a separate shunt connected reactance compensator may be considered.

Note that with the VPFT of the present invention, impedance compensation may be performed by appropriately setting the compensating resistance demand, R*, and the compensating reactance demand, X*, at the controller to minimize system fault current. In particular, the VPFT and the controller in such a situation measure the magnitude of the line current to determine if it exceeds a predetermined level, and upon such determination, the VPFT controllably injects the maximum amount of inductive reactance in series with the transmission line until the fault clears and then reestablishes the controlled compensation. Note also that with the VPFT of the present invention, the transformer leakage reactance can be kept to a minimum possible value.

The main differences between a UPFC as shown in FIG. 12 and a VPFT as shown in FIG. 14 are as follows:

a. In a UPFC, only the real component of the power exchanged by the series injected compensating voltage with the transmission line flows back to the line through the DC link capacitor and the shunt connected converter, STATCOM. The real current of such real component alters the voltage at the point of connection of STATCOM with the transmission line. The voltage of the transmission line may be controlled independently by regulating the reactive current flow through the STATCOM. In a VPFT, both the real and the reactive power exchanged by the series injected compensating voltage with the transmission line flow back to the line through the exciter unit. The real and reactive components of the current of such power flow transformer alter the voltage at the point of connection of the exciter unit with the transmission line. The loading effect of such currents on the power system network is independent of each other. Therefore, if it is desirable to compensate the combined loading effects of the real and the reactive current through the exciter unit into the power system network, a separate shunt connected reactance compensator may be considered.

b. The UPFC has the capability of fast response in sub-cycle time. However, such capability is not used in a power system application because step-injection of voltage in a transmission line may cause unwanted disturbances in the power system including instability. The VPFT has a response that is limited by the speed of the mechanical or solid state tap changer, which is quite adequate for most utility applications. Of course, dynamic performance can be improved, when needed, by replacing a mechanical tap changer with a solid state tap changer such as the thyristor-controlled switches of FIG. 3.

c. In a UPFC, only 10–15% of the cost is estimated to be in transformers. The remainder is in delicate power electronics and accessories. The cost of the same rated VPFT is estimated to be about 20% that of a UPFC.

The main differences between a PAR as discussed in connection with FIGS. 10A–10E and a VPFT as shown in FIG. 14 are as follows:

a. In a PAR, the effective phase angle of the line voltage is varied by injecting a series voltage in quadrature with the phase-to-neutral voltage of the transmission line. The effect is such that both the real and the reactive power flow in the line are changed simultaneously. In a VPFT, the injected voltage is at any angle with respect to the prevailing line current and, therefore, emulates in series with the said transmission line, a capacitor, an inductor, a positive resistor that absorbs real power from the line and a negative resistor that delivers real power to the line. The effect is such that both the real and the reactive power flow in the line are changed selectively just like a UPFC. In addition, a VPFT can regulate the line voltage by utilizing the unused portions of the transformer windings, thereby not requiring any extra hardware.

b. In order to realize the functions of regulating the real and the reactive power flow in the line selectively and regulating the line voltage, a VPFT employs only one single-core three-phase transformer. In a PAR, the same functions are realized by using two transformers, one for direct voltage injection and the other for quadrature voltage injection.

c. In a PAR configuration, it is not possible to place taps on the primary side of the regulating transformer because of the shorting that occurs when zero insertion voltage is needed. In an improved version of a VPFT, discussed below, the taps are indeed placed on the primary side of the transformer. The magnitude of the composite voltage can be changed between zero and the maximum voltage that any of the windings can offer. Note that If the maximum voltages induced in all three windings (a1, a2 and a3) are combined, the composite voltage is zero. This property makes it possible to move all the taps to the exciter unit and to keep the series compensating unit relatively simple. The taps can be operated during a normal flow of line current and a high fault current.

It is to be appreciated that the VPFT of the present invention may be modified to be employed in other multi-phase transmission line schemes, including four-phase, five-phase, six-phase, etc. For example, for a six-phase scheme, the VPFT would have six primary windings and each primary winding would have six secondary windings for a total of thirty-six secondary windings. Further details of such a multi-phase VPFT should be apparent to the relevant public and therefore need not be described herein in any detail.

Following are variations of the VPFT as disclosed above and in connection with FIGS. 14–16.

Shunt Compensating Transformer

In one variation of the present invention, the VPFT is operated as a shunt-compensating transformer such as the shunt-compensating transformer discussed above in connection with FIG. 2. In particular, and as seen in FIG. 17, the VPFT of FIG. 14 is operated to inject a compensating in-phase (0 degrees) or out-of-phase (180 degrees) voltage of line frequency in series with the line through an auto-transformer action so as to regulate the magnitude of the line voltage at a point in a transmission line, but not alter the phase of such line voltage.

As with the VPFT of FIG. 14, the line voltage is applied to a shunt-connected single-core three-phase transformer's primary windings. Also as with the VPFT of FIG. 14, the compensating voltage in any phase is derived from the induced voltages on three windings, each of which is placed on the transformer core of a different phase. Here, the positive (in-phase) compensating voltage for any phase is derived solely from the winding placed on the corresponding phase of the transformer core, and the negative (out-of-phase) compensating voltage for such phase is derived from the vectorial sum of an equal number of turns of the other two windings.

Figure 17:
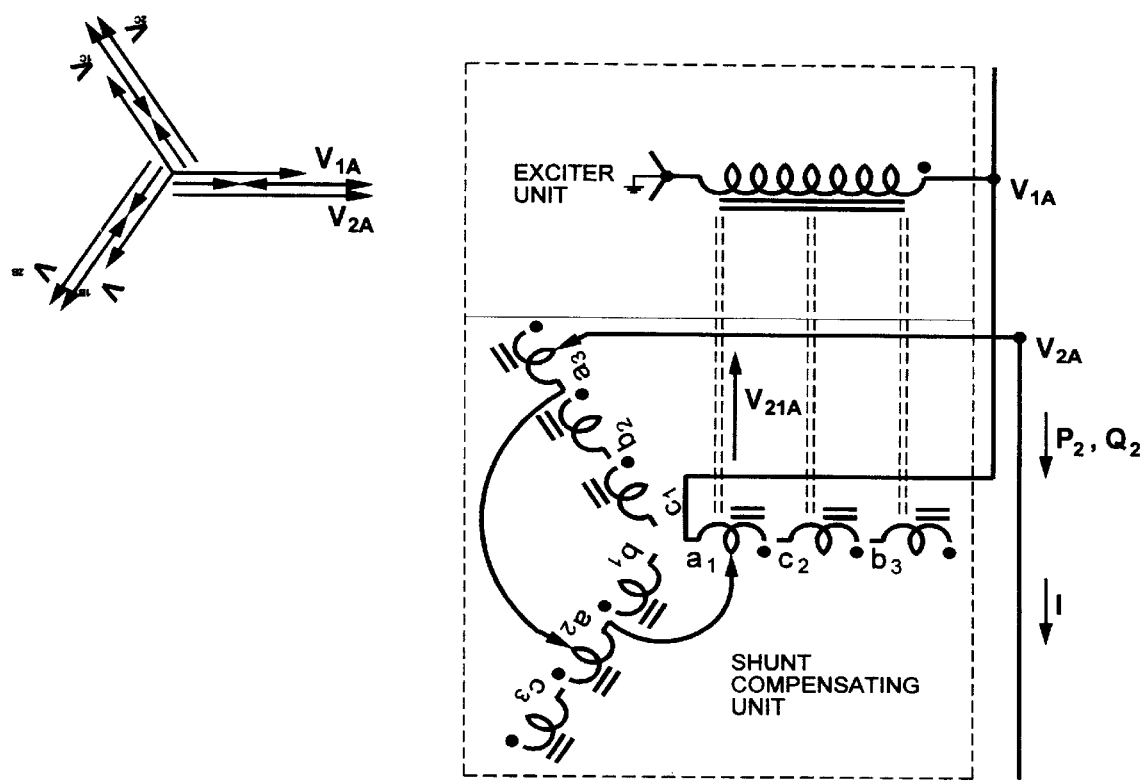
FIG. 17 is a schematic diagram showing a shunt compensating transformer scheme for voltage regulation in accordance with one embodiment of the present invention.

In particular, and as seen in FIG. 17, in the shunt compensating transformer, the line voltage is applied across the primary windings 1A, 1B, 1C in the exciter unit (only winding 1A being shown). Each primary winding has three secondary windings in series, for a total of nine secondary windings—a1, c2 and b3 on the core of A-phase; b1, a2 and c3 on the core of B-phase; and c1, b2 and a3 on the core of C-phase. As seen, a compensating voltage for any phase is derived from the vectorial sum of the voltages induced in a three-phase winding set—a1, a2 and a3 for injection in A-phase; b1, b2 and b3 for injection in B-phase; and c1, c2 and c3 for injection in C-phase. A tap is employed on each of the nine secondary windings so that each entity in each vectorial sum can be individually magnitudally varied, although it is to be appreciated that to regulate the magnitude of the line voltage at a point in a transmission line while at the same time not altering the phase of such line voltage, the mutual settings of the taps are necessarily restricted.

As with the VPFT of FIG. 14, in the shunt compensating transformer of FIG. 17, the voltage $V_{21A}$ (shown) is:

$$V_{21A} = \%x\ a1 + \%y\ a2 + \%z\ a3;$$

and voltage $V_{21A}$ is injected as a compensating voltage in line with $V_{1A}$ to produce compensated voltage $V_{2A}$:

$$V_{2A} = V_{21A} + V_{1A}.$$

Compensating voltages $V_{21B}$ for the B-phase and $V_{21C}$ for the C-phase are similarly produced:

$$V_{21B} = \%x\ b1 + \%y\ b2 + \%z\ b3;$$

$$V_{2B} = V_{21B} + V_{1B}.$$

$$V_{21C} = \%x\ c1 + \%y\ c2 + \%z\ c3;$$

$$V_{2C} = V_{21C} + V_{1C}.$$

Importantly, to produce an in-phase or out-of-phase compensating voltage in the shunt compensating transformer, %y and %z are set to be substantially equal such that the vectorial sum of each of %y a2+%z a3, %y b2+%z b3, and %y c2+%z c3 is out-of-phase with %x a1, %x b1, and %x c1, respectively. As should be appreciated, then, the resulting voltages $V_{21A}$, $V_{21B}$, $V_{21C}$, are either in-phase or out-of-phase with respect to $V_{1A}$, $V_{1B}$, $V_{1C}$, respectively.

Preferably, to produce an in-phase compensating voltage in the shunt compensating transformer, %y and %z are set to be substantially zero. Also preferably, to produce an out-of-phase compensating voltage in the shunt compensating transformer, %x is set to be substantially zero and %y and %z are set to be substantially equal.

The controller of the control block diagram of FIG. 15 may also be employed in connection with the shunt compensating transformer of FIG. 17, although such controller is not strictly necessary since only the magnitude of V, is being altered.

Once the compensating voltage demand $V_{dq}^*$ and whether the compensating voltage is to be in- or out-of-phase have been defined, and with knowledge of the limitation that %y and %z are to be substantially equal, the Tap Control Unit in FIG. 15 determines the contribution from each winding of a 3-phase set (a1, a2, and a3 for injection in A-phase; b1, b2, and b3 for injection in B-phase; and c1, c2, and c3 for injection in C-phase) to constitute $V_{dq}^*$. In particular, from knowledge of the magnitude of the exciter voltage, $V_1$, the Tap Control Unit determines the number of turns necessary on each winding of the series-compensating unit. The actual method of such determination is known or should be apparent to the relevant public and therefore need not be discussed herein in any detail. Based on this calculation, the appropriate taps are switched on via an appropriate mechanical or solid state tap changer (see FIG. 3, e.g.), which accordingly put the required number of turns in series with the line. Of course, other methods of controlling the shunt compensating transformer of FIG. 17 may be employed without departing from the spirit and scope of the present invention.

As with the VPFT of FIG. 14, it is to be appreciated that the shunt compensating transformer of FIG. 17 may be modified to be employed in other multi-phase transmission line schemes, including four-phase, five-phase, six-phase, etc. Details of such a multi-phase shunt-compensating transformer should be apparent to the relevant public and therefore need not be described herein in any detail.

The shunt compensating transformer of FIG. 17 injects a compensating voltage in series with the line either in- or out-of-phase with the line voltage. As may be appreciated, the compensating voltage is at any angle with the prevailing line current. Accordingly, and as with the VPFT of FIG. 14, the compensating voltage of the shunt compensating transformer of FIG. 17 exchanges real and reactive power with the line. Since the compensating voltage is derived from the line voltage through a transformer action with the primary winding, the exchanged real and reactive power with the line must flow through the primary winding to the line. Since the series injected voltage is, typically, only a few percent of the line voltage, the shunt current would be the same few percent of the line current.

Series Compensating Transformer

In another variation of the present invention, the VPFT of FIG. 14 is operated as a series compensating transformer. In particular, and as seen in FIG. 18, the VPFT of FIG. 14 is operated to inject a compensating voltage of line frequency in series with the line through an auto-transformer action so as to regulate both the magnitude and phase of the line voltage at a point in a transmission line.

As with the VPFT of FIG. 14, the line voltage is applied to a shunt-connected single-core three-phase transformer's primary windings. Also as with the VPFT of FIG. 14, the compensating voltage in any phase is derived from the induced voltages on three windings, each of which is placed on the transformer core of a different phase. Here, by choosing the number of turns of each of the three windings, and therefore the magnitudes of the components of the three induced voltages, the composite series injected voltage magnitude and angle with respect to the transmission line voltage is selected. The compensating voltage can be at any angle with the prevailing line current, which emulates, in series with the line, a capacitor that increases the power flow of the line or an inductor that decreases the power flow of the line and a positive resistor that absorbs real power from the line or a negative resistor that delivers real power to the line. The effect is such that the real and the reactive power flow in a transmission line can be regulated selectively. As a special case, the compensating voltage can be in quadrature with the phase-to-neutral voltage of the transmission line, thereby regulating the effective phase angle of the line voltage.

Figure 18:
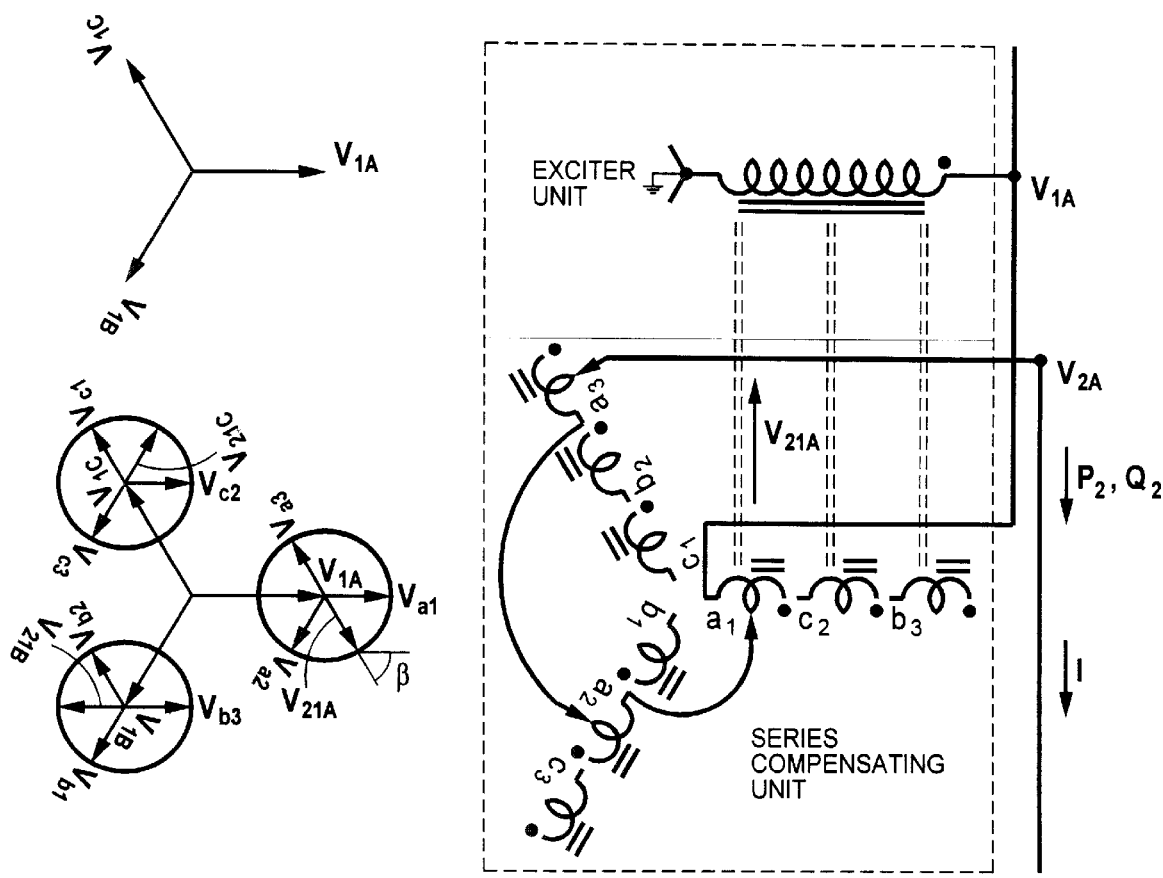
FIG. 18 is a schematic diagram showing a series compensating transformer scheme for voltage and angle regulation in accordance with one embodiment of the present invention.

In particular, and as seen in FIG. 18, in the series compensating transformer, the line voltage is applied across the primary windings 1A, 1B, 1C in the exciter unit (only winding 1A being shown). Each primary winding has three secondary windings in series, for a total of nine secondary windings—a1, c2 and b3 on the core of A-phase; b1, a2 and c3 on the core of B-phase; and c1, b2 and a3 on the core of C-phase. As seen, a compensating voltage for any phase is derived from the vectorial sum of the voltages induced in a three-phase winding set—a1, a2 and a3 for injection in A-phase; b1, b2 and b3 for injection in B-phase; and c1, c2 and c3 for injection in C-phase. A tap is employed on each of the nine secondary windings so that each entity in each vectorial sum can be individually magnitudally varied. It is to be appreciated that in the series compensating transformer of FIG. 18, and in contrast with the shunt compensating transformer of FIG. 17, mutual settings of the taps are different in the series compensating transformer of FIG. 18 so that it regulates both the magnitude and phase of the line voltage at a point in a transmission line.

As with the VPFT of FIG. 14, in the series compensating transformer of FIG. 18, the voltage $V_{21A}$ (shown) is:

$$V_{21A} = \%x\ a1 + \%y\ a2 + \%z\ a3;$$

and voltage $V_{21A}$ is injected as a compensating voltage in line with $V_{1A}$ to produce compensated voltage $V_{2A}$:

$$V_{2A} = V_{21A} + V_{1A}.$$

Compensating voltages $V_{21B}$ for the B-phase and $V_{21C}$ for the C-phase are similarly produced:

$$V_{21B} = \%x\ b1 + \%y\ b2 + \%z\ b3;$$

$$V_{2B} = V_{21B} + V_{1B}.$$

$$V_{21C} = \%x\ c1 + \%y\ c2 + \%z\ c3;$$

$$V_{2C} = V_{21C} + V_{1C}.$$

The controller of the control block diagram of FIG. 15 may also be employed in connection with the series compensating transformer of FIG. 18. Such controller or a variation thereof is necessary inasmuch as both the magnitude and phase of $V_1$ is being altered. Accordingly, the controller controlling the series compensating transformer is concerned with the required magnitude alteration (i.e., the desired series injection voltage, $V_{dq}^*$), and with the angle $\beta$ of FIG. 15.

Once the desired series injection voltage $V_{dq}^*$ and angle $\beta$ are defined, the Tap Control Unit in FIG. 15 determines the contribution from each winding of a 3-phase set (a1, a2, and a3 for injection in A-phase; b1, b2, and b3 for injection in B-phase; and c1, c2, and c3 for injection in C-phase) to constitute the defined $V_{dq}^*$ and $\beta$. In particular, from knowledge of the magnitude of the exciter voltage, $V_1$, the Tap Control Unit determines the number of turns necessary on each winding of the series-compensating unit. The actual method of such determination is known or should be apparent to the relevant public and therefore need not be discussed herein in any detail. Based on this calculation, the appropriate taps are switched on via an appropriate mechanical or solid state tap changer (see FIG. 3, e.g.), which accordingly put the required number of turns in series with the line. Of course, other methods of controlling the series compensating transformer of FIG. 18 may be employed without departing from the spirit and scope of the present invention.

The series compensating transformer of FIG. 18 injects a compensating voltage in series with the line at any angle with respect to the line voltage. The compensating voltage is at any angle with respect to the line voltage and line current. This requires the compensating voltage to exchange real and reactive power with the line. Since the compensating voltage is derived from the line voltage through a transformer action with the primary winding, the exchanged real and reactive power with the line must flow through the primary winding to the line. Since the series injected voltage is, typically, only a few percent of the line voltage, the shunt current would be the same few percent of the line current. Thus, the real and the reactive power flow in a transmission line can be regulated selectively. A special case of an injection angle of 90° is achieved by using a Phase Angle Regulator (PAR) that injects a voltage in quadrature with the phase-to-neutral voltage of the transmission line.

As with the VPFT of FIG. 14, it is to be appreciated that the series compensating transformer of FIG. 18 may be modified to be employed in other multi-phase transmission line schemes, including four-phase, five-phase, six-phase, etc. Details of such a multi-phase series-compensating transformer should be apparent to the relevant public and therefore need not be described herein in any detail.

Limited Injection Angle Series Compensating Transformers

Figure 19:
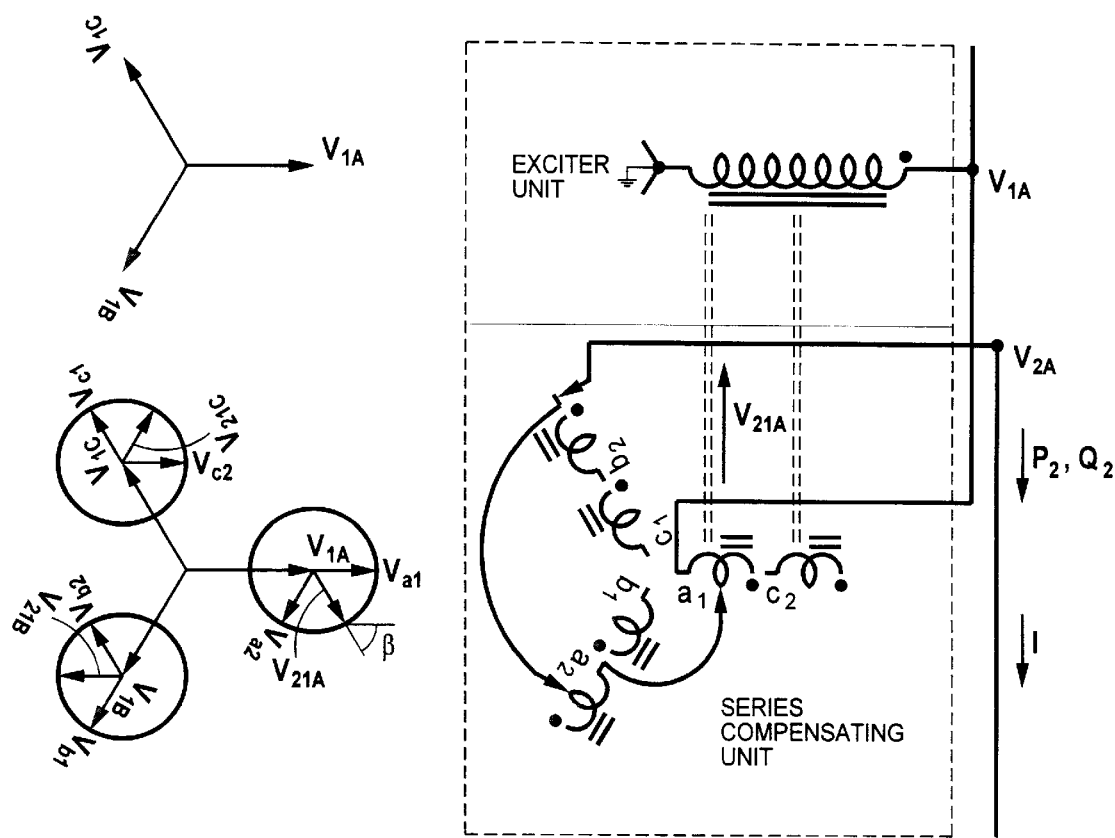
FIGS. 19–22 are schematic diagrams showing series compensating transformer schemes for voltage and angle regulation between 0 and −120°, 0 and 120°, 120° and 240°, and −60° and 60°, respectively, in accordance with respective embodiments of the present invention.
Figure 20:
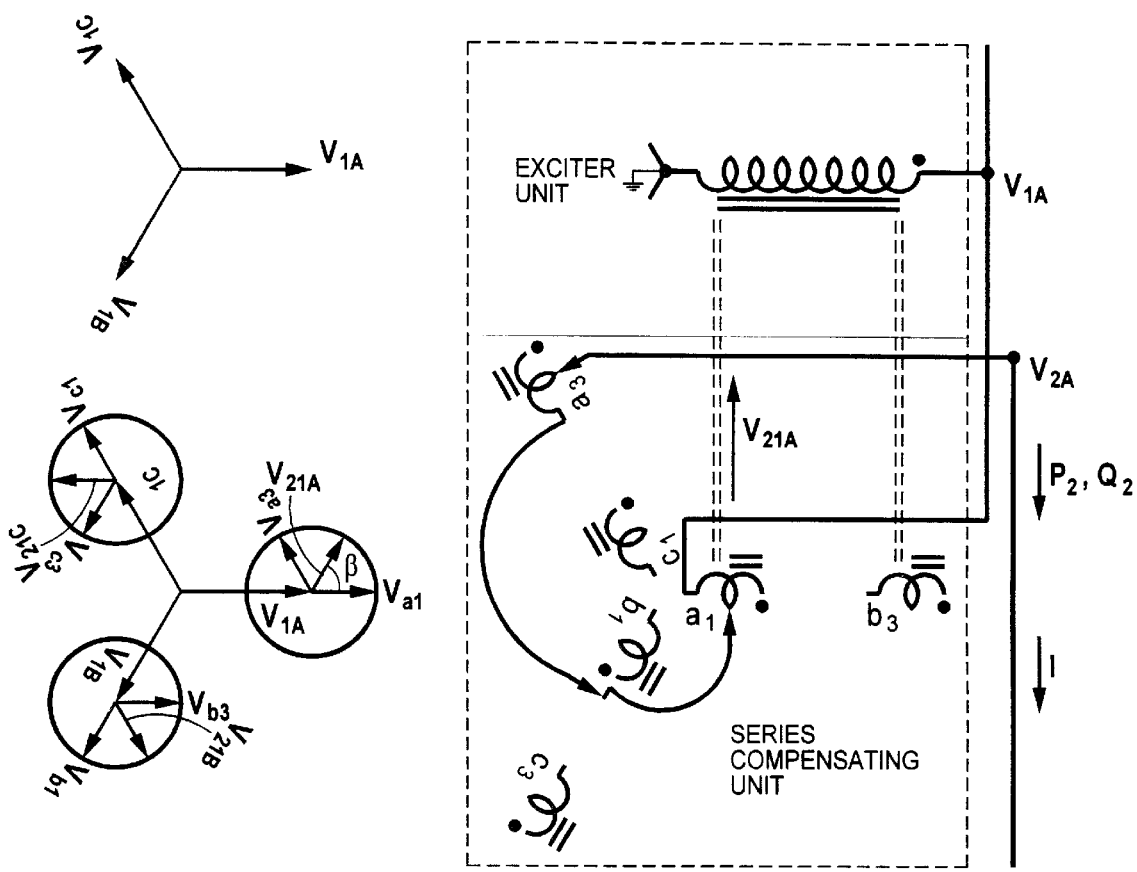
Figure 21:
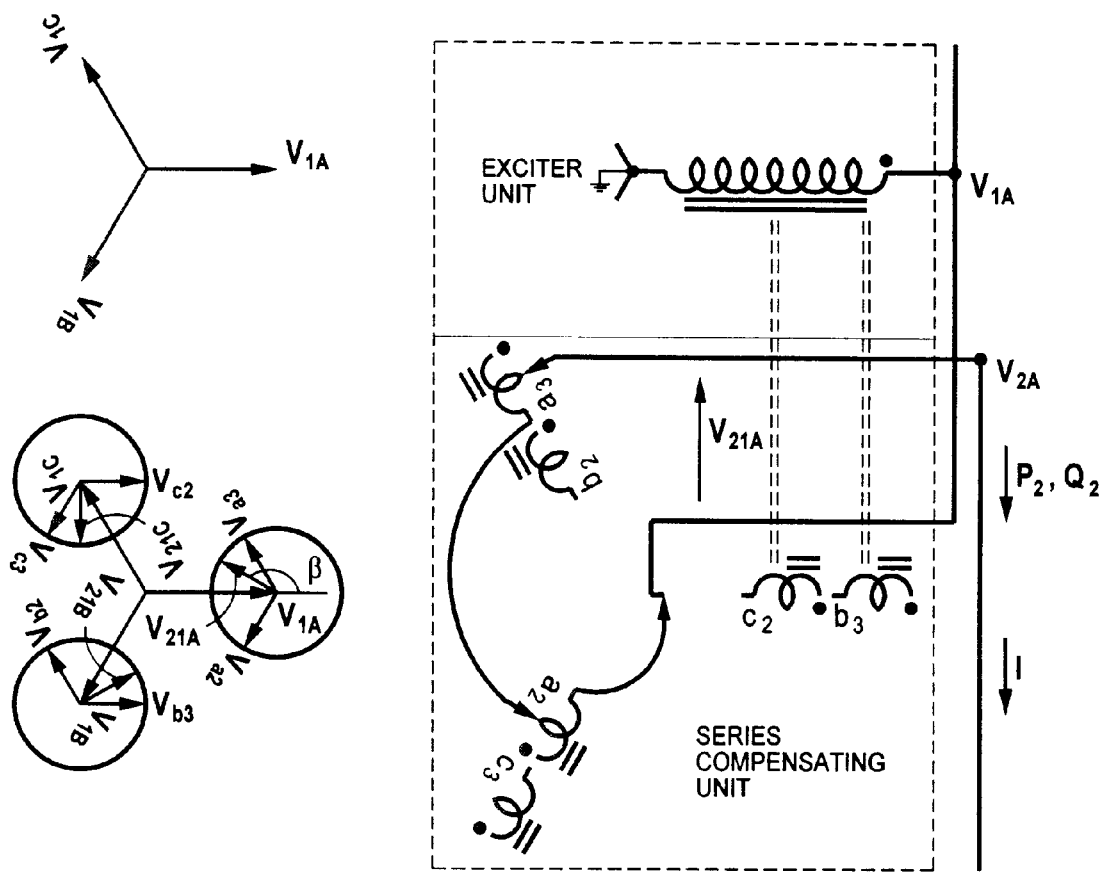

In another variation of the present invention, the VPFT of FIG. 14 is operated as a series compensating transformer with limited injection angle regulation. In particular, and as seen in FIGS. 19–21, the VPFT of FIG. 14 is operated as a series compensating transformer such as that in FIG. 18, except that each primary winding has less than three secondary windings.

In some applications, it may not be necessary to be able to inject a series voltage at any angle between 0 to 360°. In an application where there is a need for injecting a voltage between 0 and −120°, a series-compensating transformer with only 6 windings as shown in FIG. 19 may be employed.

As seen, the 0 to −120° angle is achieved by constructing the series injection voltage from a combination of two series voltages, each of which is induced in a separate winding of a 2-phase set.

Here, the line voltage is applied across the primary windings 1A, 1B, 1C in the exciter unit (only winding 1A being shown). Each primary winding has two secondary windings in series, for a total of six secondary windings—a1 and c2 on the core of A-phase; b1 and a2 on the core of B-phase; and c1 and b2 on the core of C-phase. A compensating voltage for any phase is derived from the vectorial sum of the voltages induced—a1 and a2 for injection in A-phase; b1 and b2 for injection in B-phase; and c1 and c2 for injection in C-phase. Once again, a tap is employed on each secondary winding so that each entity in each vectorial sum can be individually magnitudally varied. Thus, the voltage $V_{21A}$ (shown) is:

$$V_{21A} = \%x\ a1 + \%y\ a2.$$

$V_{21B}$ and $V_{21C}$ are similarly produced:

$$V_{21B} = \%x\ b + \%y\ b2;$$

and $$V_{21C} = \%x\ c1 + \%y\ c2.$$

Similarly, in an application where there is a need for injecting a voltage between 0 and 120°, a series-compensating transformer with only 6 windings as shown in FIG. 20 may be employed. As seen, the 0 to 120° angle is also achieved by constructing the series injection voltage from a combination of two series voltages, each of which is induced in a separate winding of a 2-phase set.

Here, the six secondary windings are—a1 and b3 on the core of A-phase; b1 and c3 on the core of B-phase; and c1 and a3 on the core of C-phase. A compensating voltage for any phase is derived from the vectorial sum of the voltages induced—a1 and a3 for injection in A-phase; b1 and b3 for injection in B-phase; and c1 and c3 for injection in C-phase. Thus, the voltages are:

$$V_{21A} \%x\ a1 + \%z\ a3.$$

$$V_{21B} = \%x\ b1 + \%z\ b3;$$

and $$V_{21C} = \%x\ c1 + \%z\ c3.$$

In an application where there is a need for injecting a voltage between 120° and 240° a series-compensating transformer with only 6 windings as shown in FIG. 21 may be employed. Here, the six secondary windings are—c2 and b3 on the core of A-phase; a2 and c3 on the core of B-phase; and b2 and a3 on the core of C-phase. A compensating voltage for any phase is derived from the vectorial sum of the voltages induced—a2 and a3 for injection in A-phase; b2 and b3 for injection in B-phase; and c2 and c3 for injection in C-phase. Thus, the voltages are:

$$V_{21A} = \%y\ a2 + \%z\ a3.$$

$$V_{21B} = \%y\ b2 + \%z\ b3;$$

and $$V_{21C} = \%y\ c2 + \%z\ c3.$$

Figure 22:
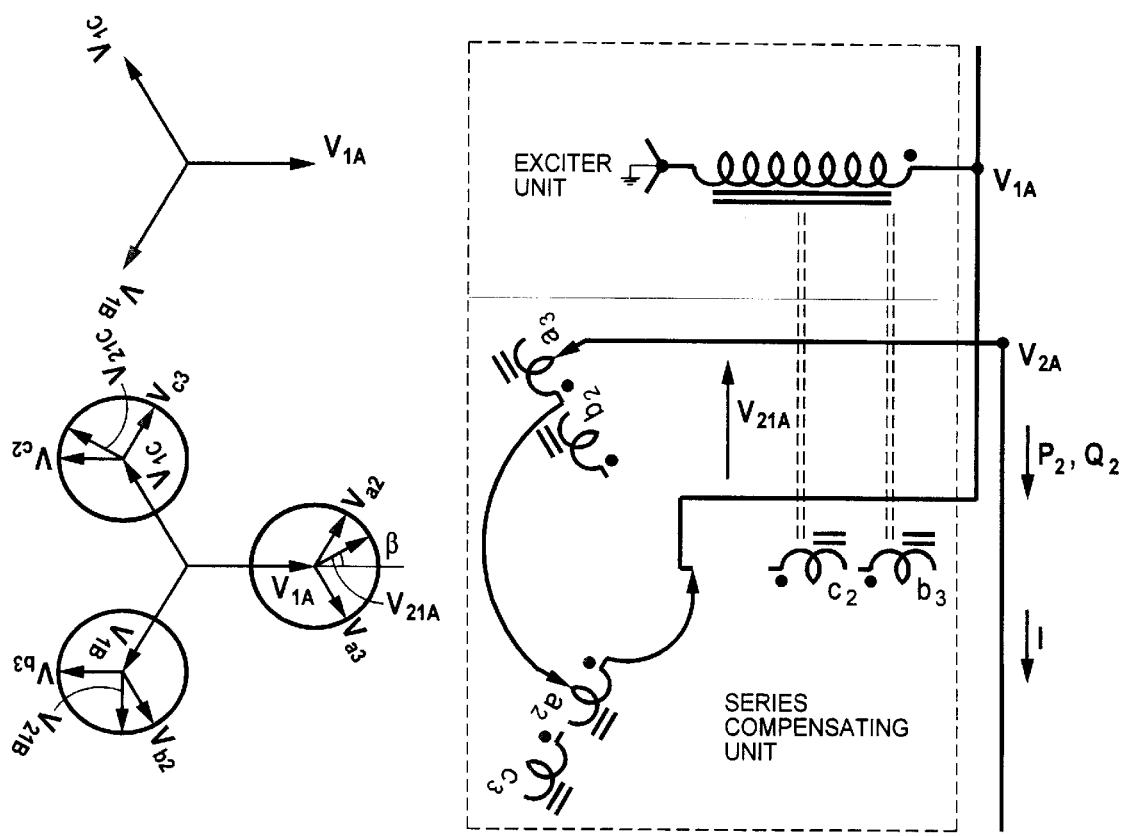

Extending the concept just presented, the polarities of the windings in the series-compensating transformer of FIG. 21 can be reversed to provide a phase angle regulation between −60° and 60°, as is shown in FIG. 22. In the same way, if the polarities of the windings in the series compensating transformers of FIGS. 19 and 20 are reversed (not shown), then phase angle regulation between 60° and 180° and between 180° and 300°, respectively, is achieved.

The controller of the control block diagram of FIG. 15 may also be employed in connection with the transformers of FIGS. 19–22 in a manner that should now be apparent to the relevant public.

Reverse VPFT Transformer

In another variation of the present invention, the VPFT of FIG. 14 is operated such that the primaries and secondaries thereof are reversed. In particular, and as seen in FIG. 23, in such a reverse VPFT transformer, the VPFT of FIG. 14 is operated as a series compensating transformer there are three secondary windings, one for each phase, and three primary windings for each secondary winding for a total of nine primary windings.

Each phase of the primary voltage is applied across any or all of three windings, each of which is placed on the transformer core of a different phase. The compensating voltage for series injection in any phase is induced in a single secondary winding. This secondary winding and three corresponding primary windings excited from three different phase voltages are placed on the respective phase of the exciter core. By choosing the number of turns in each of the three primary windings, and therefore the magnitudes of the components of the three primary winding voltages, the composite series injected voltage's magnitude and angle with respect to the transmission line voltage can be selected.

As with the series compensating transformer of FIG. 18, for example, the compensating voltage can be at any angle with the prevailing line current and therefore emulates, in series with the line, a capacitor that increases the power flow of the line or an inductor that decreases the power flow of the line and a positive resistor that absorbs real power from the line or a negative resistor that delivers real power to the line. The effect is such that the real and the reactive power flow in a transmission line can be regulated selectively. In addition, and as with the shunt compensating transformer of FIG. 17, for example, the reverse transformer can regulate the line voltage by utilizing the unused portions of the transformer windings as a shunt compensating unit.

Figure 23:
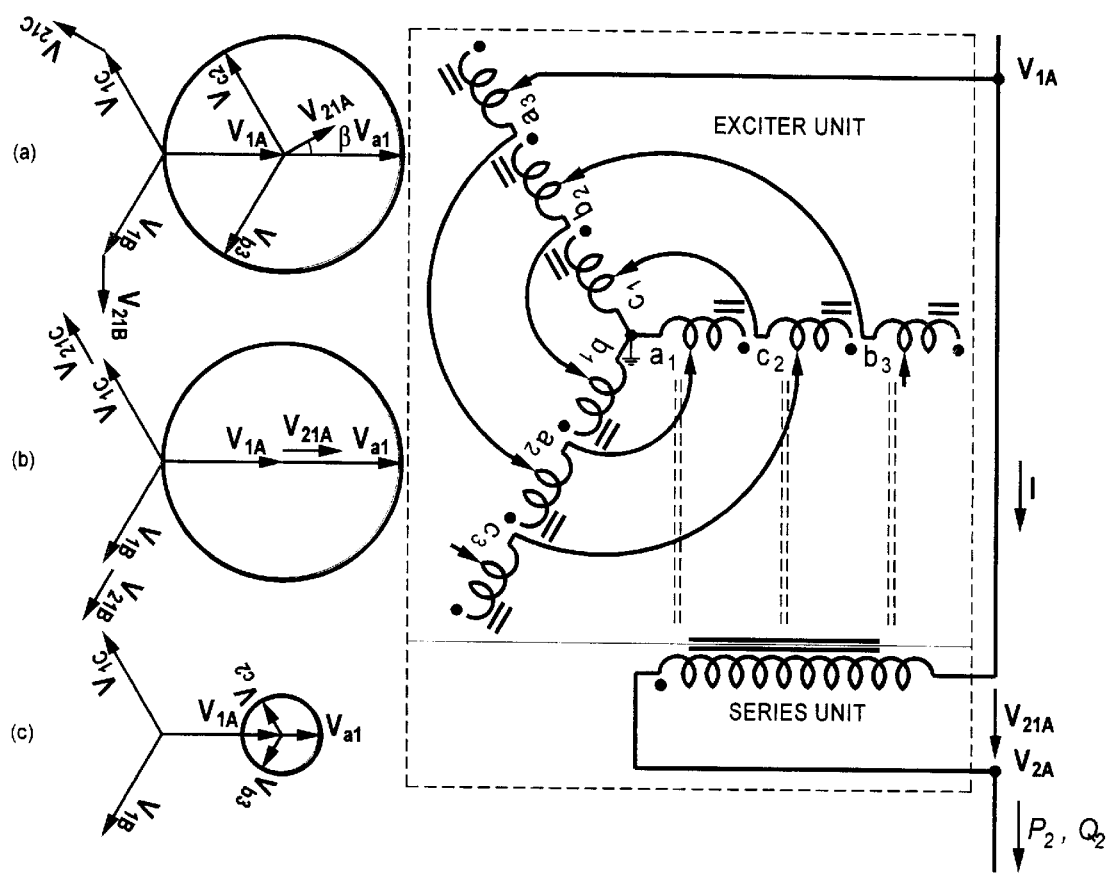
FIG. 23 is a schematic diagram showing a variation on the versatile power flow transformer (VPFT) of FIG. 14 in accordance with one embodiment of the present invention.

As seen at section (a) of FIG. 23, a phasor diagram for the reverse transformer shows a three-phase line voltage $V_{1A,B,C}$. The voltage, $V_{1A}$, is applied across three windings a1, a2 and a3. The voltage, $V_{1B}$, is applied across three windings b1, b2 and b3. The voltage, $V_{1C}$, is applied across three windings c1, c2 and c3. The number of turns of each of a1, a2, a3, b1, b2, b3, c1, c2, and c3 is individually controlled by a mechanical or solid state tap changer such as the tap changer shown in FIG. 3. The composite voltage from the three windings (a1, c2 and b3) on the primary side (exciter unit) is reflected on the secondary side (series unit) in A-phase. Likewise, the composite voltage from the three windings (b1, a2 and c3) is reflected on the secondary side in B-phase, and the composite voltage from the three windings (c1, b2 and a3) is reflected on the secondary side in C-phase. Depending on the number of turns chosen on the three windings (a1, c2 and b3), (b1, a2 and c3), (c1, b2 and a3), the series injection voltage's magnitude and angle are determined.

Put mathematically, $V_{21A}=N(\%x\ a1+\%y\ c2+\%z\ b3);$ $V_{21B}=N(\%x\ b1+\%y\ a2+\%z\ c3);$ and $V_{21C}=N(\%x\ c1+\%y\ b2+\%z\ a3).$ where N is a constant based on the turns ratios between the primary windings and the secondary winding.

For example, in section (b) of FIG. 23, a phasor diagram shows the exciter voltage is applied across one winding in each phase only. The series injection voltage is in phase with the line voltage and its magnitude is dependent on the number of turns in the series winding and the winding a1. Thus, the reverse transformer is acting as a shunt compensating transformer such as that shown in FIG. 17.

Correspondingly, in section (c) of FIG. 24, a phasor diagram shows the exciter voltage is applied across three windings a1, a2 and a3 with predetermined numbers of turns. The series injection voltage $V_{21}$ is thus the vectorial sum of the voltages across the three windings multiplied by the turns ration N. Thus, the reverse transformer is acting as a series compensating transformer such as that shown in FIG. 18. If, as shown the numbers of turns are equal, the sum is zero with same number of turns, the series injection voltage is the vectorial sum of three equal voltages with 120° phase difference from one another. That is, the sum is zero. The same principle applies to the other two phases of series injection voltage as well.

The controller of the control block diagram of FIG. 15 may also be employed in connection with the reverse transformer in a manner that should now be apparent to the relevant public. Of course, other controllers may be employed without departing from the spirit and scope of the present invention.

Notably, just as the series compensating transformer of FIG. 18 may be limited in operation to certain phase angles, as was discussed in connection with FIGS. 19–22, so too may the reverse VPFT transformer be limited in operation to certain phase angles by similar machinations. Such machinations should now be apparent to the relevant public, especially in view of the discussed in connection with FIGS. 19–22, and therefore need not be described herein in any further detail.

In the reverse transformer of FIG. 23, the compensating voltage $V_{21}$ is of variable magnitude and at any angle with respect to the line voltage. The real or direct component of the compensating voltage provides the voltage regulation; whereas the reactive or quadrature component provides the phase angle regulation. The compensating voltage can also be at any angle with respect to the prevailing line current. The real or direct component of the compensating voltage provides the series resistance emulation; whereas the reactive or quadrature component provides the series reactance emulation. The resistance emulator can be used to dampen oscillations, which may be created by an existing capacitor in the transmission system. The reactance emulator can be used to provide the reactance compensation of the transmission line. All of the transmission parameters can be regulated simultaneously by injecting a resultant series voltage, which can be derived from the line voltage and, in turn, the real and the reactive power flow in the line can be regulated selectively. The compensating voltage $V_{21}$ is always of line frequency and does not induce subsynchronous resonance.

The tap-changer technology-based reverse transformer injects a series voltage of variable magnitude at any angle with respect to the prevailing line current as well as line voltage. The compensating voltage exchanges both real and reactive power with the line. Since the compensating voltage is derived from the line voltage through a transformer action with the primary winding, the exchanged real and reactive power with the line must flow through the primary winding to the line. Since the series injected voltage is, typically, only a few percent of the line voltage, the shunt current would be the same few percent of the line current. The current through the exciter unit has both real and reactive components. The loading effect of these two currents on the power system network is independent of each other. Therefore, if it is desirable to compensate the combined loading effect of the real and the reactive current through exciter unit into the power system network, a separate shunt connected reactance compensator may be considered.

CONCLUSION

The hardware necessary to effectuate the present invention, such as the transformers and tap changers, is known or should be readily apparent to the relevant public. Accordingly, further details as to the specifics of such hardware are not believed to be necessary herein. The programming necessary to effectuate the present invention, such as the programming run by the controller of FIG. 15, is likewise known or should be readily apparent to the relevant public. Accordingly, further details as to the specifics of such programming are also not believed to be necessary herein.

As should now be understood, in the present invention, a versatile power flow transformer (VPFT) and variations thereof are based on the traditional technologies of transformers and tap changers, and are employed to selectively control the real and the reactive power flow in a line and regulate the voltage of the transmission line. Such VPFT generates a compensating voltage of line frequency for series injection with a transmission line. Such compensating voltage is extracted from the line voltage and is of variable magnitude and at any angle with respect to the line voltage. The compensating voltage is also at any angle with respect to the prevailing line current, which emulates, in series with the line, a capacitor that increases the power flow of the line or an inductor that decreases the power flow of the line and a positive resistor that absorbs real power from the line or a negative resistor that delivers real power to the line. Accordingly, the real and the reactive power flow in a transmission line can be regulated selectively. Changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

What is claimed is:

1. A power flow transformer for implementing power flow control in a transmission line of an n-phase power transmission system, each phase of the power transmission system having a transmission voltage, the transformer comprising:
   n secondary windings, each secondary winding on a core;
   n primary windings on the core of each secondary winding for a total of $n^2$ primary windings, one primary winding from each core being assigned to each phase;
   for each phase, the primary windings assigned to the phase being coupled in series, the in-series primary windings for receiving the transmission voltage of the respective phase of the power transmission system;
   for each core, each primary winding thereon inducing a voltage in the secondary thereon, the induced voltages being summed by the secondary to result in a summed induced voltage, wherein the summed induced voltage is a compensating voltage for a respective phase.

2. The transformer of claim 1 wherein, for each phase, the secondary winding is coupled in series with the transmission voltage corresponding to the phase, wherein the compensating voltage is added to the transmission voltage of the phase to result in a compensated voltage for the phase.

3. The transformer of claim 1 for implementing power flow control in a transmission line of a 3-phase (A, B, C) power transmission system, the transformer comprising:
   3 secondary windings;
   3 primary windings on the core of each secondary winding for a total of 9 primary windings:
      primary windings a1, c2 and b3 on the core of the secondary winding associated with A-phase;
      primary windings b1, a2 and c3 on the core of the secondary winding associated with B-phase; and
      primary windings c1, b2 and a3 on the core of the secondary winding associated with C-phase;
   a1, a2 and a3 being coupled in series;
   b1, b2 and b3 being coupled in series; and
   c1, c2 and c3 being coupled in series.

4. The transformer of claim 3 further comprising an adjustable tap changer coupled to each primary winding, each tap changer for individually magnitudally varying the voltage on the corresponding primary winding, wherein the compensating voltage $V_{21A}$ for A-phase, the compensating voltage $V_{21B}$ for B-phase, and the compensating voltage $V_{21C}$ for C-phase are:

$$V_{21A}=N(\%x\ a1+\%y\ c2+\%z\ b3);$$

$$V_{21B}=N(\%x\ b1+\%y\ a2+\%z\ c3);$$

and $$V_{21C}=N(\%x\ c1+\%y\ b2+\%z\ a3),$$

%x, %y, and %z each being set according to the tap changers winding and N being a constant based on the turns ratios between the primary windings and the secondary winding, and wherein, for each phase, the summed induced voltage is angularly adjustable by adjusting the tap changers of the phase.

5. The transformer of claim 4 wherein %x, %y, and %z are each set between 0 and 1 according to the tap changers.

6. The transformer of claim 4 wherein %x, %y, and %z are each set between −0.5 and 0.5 according to the tap changers.

7. The transformer of claim 3 wherein a1, b1, and c1 are substantially identical; a2, b2, and c2 are substantially identical; and a3, b3, and c3 are substantially identical.

8. The transformer of claim 1 further comprising an adjustable tap changer coupled to each primary winding, each tap changer for individually magnitudally varying the voltage on the corresponding primary winding, wherein, for each phase, the primary windings assigned to the phase as magnitudally varied by the respective tap changers are coupled in series, and wherein, for each phase, the summed induced voltage is angularly adjustable by adjusting the tap changers of the phase.

9. The transformer of claim 8 wherein the compensating voltage is adjustable to any angle with respect to prevailing line current, the transformer thereby being capable of emulating in series with the transmission line an inductor, a capacitor, a positive resistor that absorbs real power from the line and/or a negative resistor that delivers real power to the line.

10. The transformer of claim 8 wherein each tap changer is selected from a group consisting of a mechanical tap changer or a solid-state tap changer.

11. The transformer of claim 8 further comprising a controller for controlling the tap changers, the controller receiving as inputs the transmission voltage of each phase of the power transmission system, a set of measured line currents, a compensating resistance demand, R*, and a compensating reactance demand, X*.

12. The transformer of claim 11 wherein the controller has:
- a first magnitude/angle calculator for calculating a magnitude, $v_1$, and a reference angle, $\Theta$, of the transmission line from the transmission voltage of each phase of the power transmission system;
- a second magnitude/angle calculator for calculating a magnitude, I, and a relative angle, $\Theta_{ir}$, with respect to $\Theta$ of the line current based on the set of measured line currents;
- a demanded impedance calculator for calculating a magnitude, Z*, and angle, $\Theta_z$, of a demanded impedance based on the compensating resistance demand, R*, and the compensating reactance demand, X*;
- an insertion voltage magnitude demand calculator for calculating an insertion voltage magnitude demand, $V_{dq}{}^*$, based on the magnitude, I, of the line current as multiplied by the demanded impedance magnitude, Z*;
- a relative phase angle demand calculator for calculating a relative phase angle demand, $\beta$, based on the sum of $\Theta_{ir}$ and $\Theta_z$; and
- a tap control unit for adjusting the tap changers based on $V_{dq}{}^*$, $\beta$, and $V_1$.

13. The transformer of claim 8 wherein each tap change is rated for high voltage and low current, whereby the tap changer is capable of carrying normal low current and higher fault current.

14. The transformer of claim 1 wherein the compensating voltage supplies and absorbs both real and reactive power.

* * * * *